United States Patent
Viorel et al.

(10) Patent No.: US 12,413,378 B1
(45) Date of Patent: Sep. 9, 2025

(54) SYSTEMS AND METHODS FOR VARIABLE TIME DIVISION DUPLEX DATA ALLOCATION

(71) Applicant: Cable Television Laboratories, Inc., Louisville, CO (US)

(72) Inventors: Dorin Gheorghe Viorel, Erie, CO (US); Ruoyu Sun, Westminster, CO (US); Yunjung Yi, Vienna, VA (US)

(73) Assignee: Cable Television Laboratories, Inc., Louisville, CO (US)

( * ) Notice: Subject to any disclaimer, the term of this patent is extended or adjusted under 35 U.S.C. 154(b) by 378 days.

(21) Appl. No.: 18/066,183

(22) Filed: Dec. 14, 2022

Related U.S. Application Data

(63) Continuation-in-part of application No. 18/055,803, filed on Nov. 15, 2022.

(60) Provisional application No. 63/289,521, filed on Dec. 14, 2021, provisional application No. 63/279,581, filed on Nov. 15, 2021.

(51) Int. Cl.
*H04L 5/14* (2006.01)
*H04W 72/0457* (2023.01)
*H04W 72/541* (2023.01)

(52) U.S. Cl.
CPC ....... *H04L 5/1469* (2013.01); *H04W 72/0457* (2023.01); *H04W 72/541* (2023.01)

(58) Field of Classification Search
CPC ............ H04L 5/1469; H04W 72/0457; H04W 72/541
See application file for complete search history.

(56) References Cited

U.S. PATENT DOCUMENTS

| | | | |
|---|---|---|---|
| 2016/0234873 A1* | 8/2016 | Ryu | H04W 52/383 |
| 2017/0238299 A1* | 8/2017 | Koudouridis | H04W 72/121 |
| | | | 370/311 |
| 2022/0014257 A1 | 1/2022 | Anderson et al. | |
| 2022/0015093 A1* | 1/2022 | Ying | H04B 7/15542 |
| 2023/0097862 A1 | 3/2023 | Horn et al. | |

(Continued)

OTHER PUBLICATIONS

Monteiro, Victor F., et al. "TDD frame design for interference handling in mobile IAB networks." Globecom 2022-2022 IEEE Global Communications Conference. IEEE, 2022. (Year: 2022).*

(Continued)

*Primary Examiner* — Sharad Rampuria
(74) *Attorney, Agent, or Firm* — PdZ Patent Law, PLLC

(57) ABSTRACT

A method for variable time division duplex (TDD) data allocation in a communication network including a donor wireless communication node and a plurality of child wireless communication nodes. The method includes (a) determining a highest traffic child wireless communication node of the plurality of child wireless communication nodes, the highest traffic child wireless communication node having a highest data transmission requirement of the plurality of child wireless communication nodes, and (b) allocating data in first TDD data frames to be transmitted between the donor wireless communication node and a first child wireless communication node of the plurality of child wireless communication nodes according to a first data frame allocation, the first data frame allocation including allocating an on-demand portion of the first TDD data frames to data associated with the highest traffic child wireless communication node.

19 Claims, 13 Drawing Sheets

(56) References Cited

U.S. PATENT DOCUMENTS

2023/0309192 A1   9/2023   Haustein et al.

OTHER PUBLICATIONS

Lerch, Martin, et al., "Cellular Uplink Impairments in Vehicular Repeater Deployments," IEEE Open Journal of Vehicular Technology (2025). (Year: 2025).

* cited by examiner

SYSTEMS AND METHODS FOR VARIABLE TIME DIVISION DUPLEX DATA ALLOCATION

CROSS REFERENCE TO RELATED APPLICATIONS

This application is a continuation in part of U.S. patent application Ser. No. 18/055,803, filed on Nov. 15, 2022, which claims the benefit of priority to U.S. Provisional Patent Application No. 63/279,581, filed on Nov. 15, 2021. This application also claims the benefit of priority to U.S. Provisional Patent Application No. 63/289,521, filed on Dec. 14, 2021. Each of the aforementioned patent applications is incorporated herein by reference.

BACKGROUND

Wireless communication networks transmit wireless communication signals between two or more wireless communication nodes. Examples of wireless communication nodes include, but are not limited to, wireless base stations, user equipment (UE) devices, and radio frequency (RF) repeaters. As such, performance of a wireless communication network is at least partially a function of quality of wireless communication links between wireless communication nodes.

DETAILED DESCRIPTION OF THE EMBODIMENTS

Figure 1:
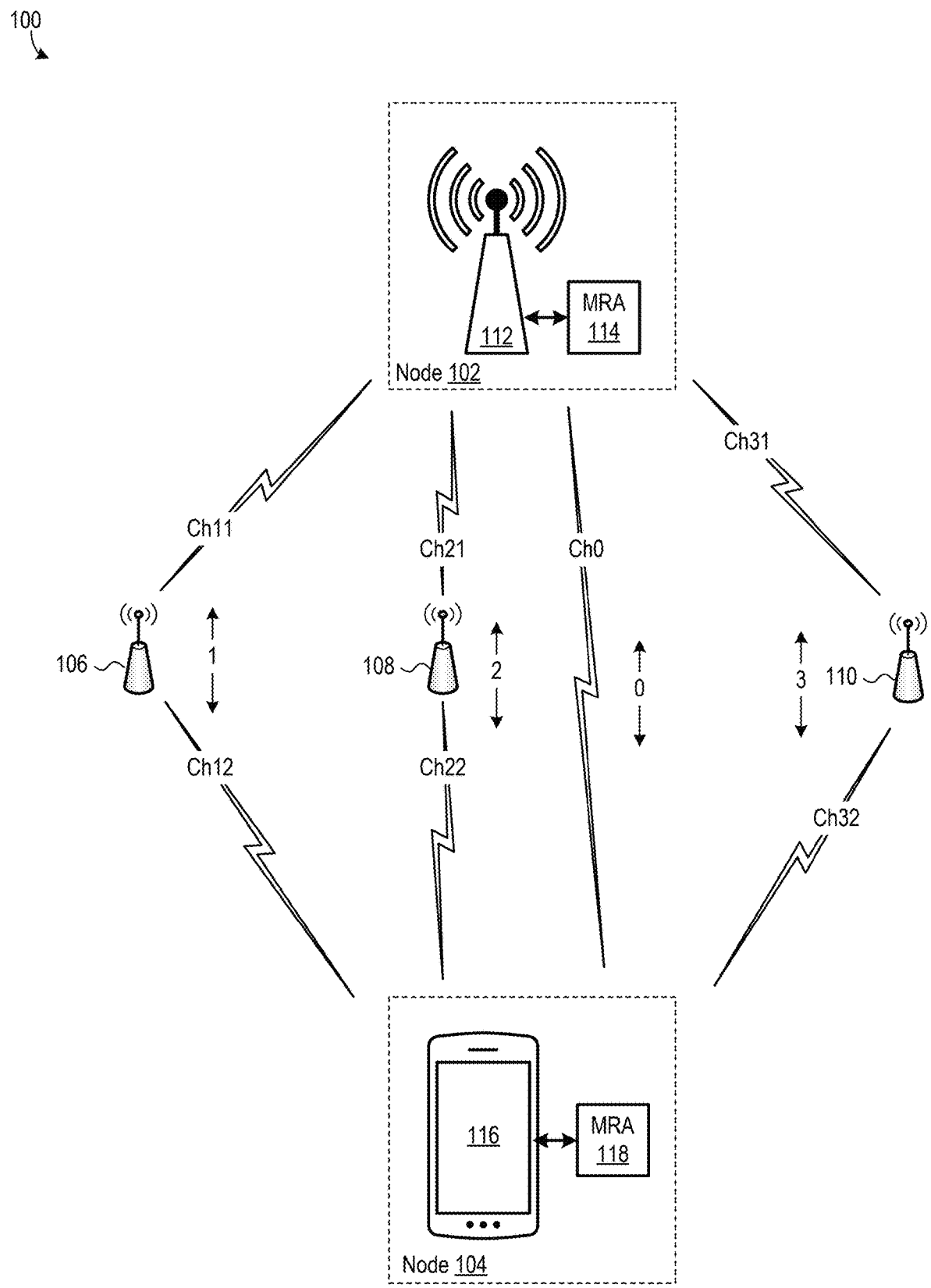
FIG. 1 is a block diagram of a wireless communication network including a system for multiple repeater aggregation (MRA), according to an embodiment.

A distance between two wireless communication nodes may be too long to transmit robust wireless communication signals between the two wireless communication nodes. Additionally, an obstacle, such as by a tree, a building, or a natural feature, may block direct transmission of wireless communication signals between two wireless communication nodes. Radio frequency (RF) repeaters, and similar devices, may be deployed to at least partially overcome such problems by extending wireless communication network range and/or by providing alternate paths for wireless communication signals to travel between wireless communication nodes.

A standard RF repeater, sometimes referred to as a RF relay, simply receives wireless communication signals, amplifies the wireless communication signals, and forwards or "repeats" the wireless communication signals to another wireless communication node. For example, the Third Generation Partnership Project (3GPP) specifies a RF repeater in the fifth generation (5G) new radio (NR) Release 17 as a device which works on a RF layer and simply amplifies and forwards all wireless communication signals it receives. A standard RF repeater does not have wireless communication beam management capability, and a standard RF repeater is typically omnidirectional. While a standard RF repeater supports full-duplex communication, a standard RF repeater is not capable of distinguishing between downlink data and uplink data. Additionally, a standard RF repeater amplifies noise and interference along with wireless communication signals. As such, deployment of a standard RF repeater in a wireless communication network may or may not improve signal to interference plus noise ratio (SINR) in the wireless communication network, depending on the environment and the operating conditions of the wireless communication network.

A smart RF repeater (SR), which may also be referred to as a network controlled repeater, has more functionality than a standard RF repeater. For example, the 3GPP 5G NR Release 18 specifies a smart RF repeater as a device which works on the RF layer of the user plane, and well as on the physical (PHY) and RF layers of the control plane. Release 18 also specifies that a smart repeater supports wireless communication beam management and that a smart repeater is capable of distinguishing between downlink data and uplink data.

Disclosed herein are new systems and methods which advance the state of the art of mesh wireless communication networks. Certain embodiments are operable with essentially any device which repeats wireless communication signals, including but not limited to, RF repeaters, RF relays, smart RF repeaters, and Integrated Access Backhaul (IAB) devices. Other embodiments leverage functionality of smart RF repeaters and similar devices.

The new systems and methods can be implemented in essentially any type of wireless communication network. For example, the new systems and methods could be embodied in 3GPP wireless communication networks, including, but not limited to, long term evolution (LTE) wireless communication networks, fifth generation (5G) wireless communication networks, sixth generation (6G) wireless communication networks, and future developed 3GPP wireless communication networks. As another example, the new systems and methods could be embodied in non-3GPP wireless communication networks, including, but not limited to, Wi-Fi wireless communication networks, satellite wireless communication networks (e.g., using very low earth orbit (VLEO) satellites, low earth orbit (LEO) satellites, medium earth orbit (MEO) satellites, or geostationary equatorial orbit (GEO) satellites), Bluetooth wireless communication networks, long range (LoRa) wireless communication protocol, Zigbee wireless communication networks, Z-Wave wireless communication networks, etc. Furthermore, the new systems and methods could be embodied in wireless communication networks using licensed RF spectrum, unlicensed RF spectrum, or a combination of licensed and unlicensed RF spectrum.

Multiple Repeater Aggregation

Applicant has developed systems and methods for multiple repeater aggregation (MRA) which leverage multiple devices which repeat wireless communication signals, such as in a mesh wireless communication network. Certain embodiments are capable of improving wireless communication network coverage and reliability, increasing wireless communication channel capacity for downlink data and/or uplink data, and or extending wireless communication network coverage. For example, some embodiments enable a wireless communication network to maintain service to a wireless communication node even if some wireless communication signals to the wireless communication node are blocked by an obstacle, e.g., one wireless communication beam is blocked, thereby helping prevent shadowing loss. As another example, certain embodiments benefit from diversity gain, which mitigates small scale fading. As an additional example, particular embodiments are capable of serving a given wireless communication node via multiple channels with low correlation between the channels, or even with no correlation between the channels, which increases channel capacity according to Shannon theory.

While the new systems and methods for MRA may achieve advantages in essentially any application, they may be especially beneficial in fixed wireless access (FWA) applications, vehicular applications, and aircraft applications. In particular, FWA applications may be particularly challenging due to FWA customer premises equipment (CPE) frequently being located indoors, as well as due FWA applications typically requiring more throughput than mobile applications. Use of the new MRA systems and methods may help improve coverage indoors and help achieve high throughput, which may make them particularly beneficial in FWA applications. Vehicular applications may also be particularly challenging due to vehicle movement, such as due to doppler shift resulting from vehicle movement. Use of the new MRA systems and methods may help mitigate such challenges. Furthermore, aircraft, such as drones, may be difficult to adequately serve using conventional wireless communication networks because conventional wireless communication networks are typically optimized for terrestrial users with down tilt in wireless base station antennas, causing coverage towards the sky to be poor. The new MRA systems and methods may be used in wireless communication networks to improve coverage towards the sky, which benefits aircraft applications.

FIG. 1 is a block diagram of a wireless communication network 100 which includes an embodiment of the new systems for MRA. Wireless communication network 100 includes a wireless communication node 102, a wireless communication node 104, a RF repeater 106, a RF repeater 108, and a RF repeater 110. It is understood, however, that wireless communication network 100 can include any quantity of wireless communication nodes and any quantity of RF repeaters, as long as wireless communication network 100 includes at least two wireless communication nodes and at least two RF repeaters. Particular embodiment of the new systems and methods for MRA do not require coordination among devices which repeat wireless communication signals. As such, in certain embodiments, RF repeaters 106, 108, and 110 are conventional RF repeaters or conventional RF relays. However, RF repeaters 106, 108, and 110 could be more sophisticated devices, such smart RF relays or IAB devices, as well as custom devices, without departing from the scope hereof.

Each of wireless communication node 102 and wireless communication node 104 is configured to transmit and receive wireless communication signals. Wireless communication node 102 includes a wireless base station 112 and a MRA module 114. In some embodiments, wireless base station 112 includes a 3GPP wireless base station, including, but not limited to, a NodeB, an eNode B, a gNodeB, or a future-developed 3GPP wireless base station. In some other embodiments, wireless base station 112 is a non-3GPP wireless base station, including, but not limited to, a Wi-Fi wireless base station, a satellite wireless base station, a Bluetooth wireless base station, a LoRa wireless base station, a Zigbee wireless base station, a Z-Wave wireless base station, etc. It should be noted that wireless base station 112 need not be a complete wireless base station. For example, in particular embodiments, wireless base station 112 is a remote radio head of a wireless base station. Additionally, wireless base station 112 could be replaced with a different type of device capable of transmitting and receiving wireless communication signals, such as a RF repeater or a user equipment (UE) device.

Wireless communication node 104 includes a UE device 116 and a MRA module 118. Although UE device 116 is depicted as being a mobile phone, UE device 116 could be another type of UE device. For example, UE device 116 could alternately be a computer, a set-top device, a data storage device, an Internet of Things (IoT) device, an entertainment device, a computer networking device, a modem, a smartwatch, a wearable device with wireless capability, a medical device, a security device, a monitoring device, or a wireless access device (including, for example, an eNB, a gNB, a Wi-Fi-based wireless access point, an IAB access point, a microcell, a picocell, a femtocell, a macrocell, a Wi-Fi-based application, a satellite communication device, etc.). Additionally, UE device 116 could be replaced with a different type of device capable of transmitting and receiving wireless communication signals, such as a RF repeater or a wireless base station.

Wireless communication network 100 includes four wireless communication paths, i.e., wireless communication path 0, wireless communication path 1, wireless communication path 2, and wireless communication path 3, between wireless communication nodes 102 and 104. Wireless communication path 0 is a direct path between wireless communication node 102 and wireless communication node 104 via a wireless channel Ch0. Accordingly, wireless communication path 0 does not include a RF repeater. Each of wireless communication paths 1, 2, and 3 includes a RF repeater.

Specifically, wireless communication path 1 includes (i) a wireless channel Ch11 between wireless communication node 102 and RF repeater 106 and (ii) a wireless channel Ch12 between RF repeater 106 and wireless communication node 104. Wireless communication path 2 includes (i) a wireless channel Ch21 between wireless communication node 102 and RF repeater 108 and (ii) a wireless channel Ch22 between RF repeater 108 and wireless communication node 104. Wireless communication path 3 includes (i) a wireless channel Ch31 between wireless communication node 102 and RF repeater 110 and (ii) a wireless channel Ch32 between RF repeater 110 and wireless communication node 104. Any of wireless communication paths 0, 1, 2, and 3 could include a plurality of wireless communication beams, and each wireless communication beam could include a plurality of streams. Any one of wireless communication paths 0, 1, 2, and 3 could carry downlink data, uplink data, or a combination of downlink data and uplink data.

It is understood that the number of wireless communication paths between wireless communication nodes 102 and 104 will vary with the number of RF repeaters in wireless communication network 100. Additionally, in some embodiments, one or more wireless communication paths between wireless communication nodes 102 and 104 may span two or more RF repeaters. Furthermore, a given wireless communication path between wireless communication nodes 102 and 104 may not be available due to, for example, the path being blocked by an obstacle.

MRA module 114 and MRA module 118 collectively form an embodiment of the new systems for MRA. In some alternate embodiments, however, one of MRA module 114 and MRA module 118 is omitted, such that solely MRA module 114 or solely MRA module 118 forms the system for MRA. Each of MRA modules 114 and 118 is implemented, for example, by a processor (not shown) executing instructions in the form of software and/or firmware stored in a data store (not shown), In some embodiment, MRA modules 114 and 118 are at least partially implemented by electronic circuitry (not shown). While MRA module 114 is depicted as being separate from wireless base station 112, MRA module 114 may be partially or fully integrated with wireless base station 112. For example, in certain embodiments, MRA module 114 is implemented by a processor of wireless base station 112 executing instructions in the form of software and/or firmware stored in a data store (e.g., a memory or a hard drive) of wireless base station 112. Similarly, although MRA module 118 is depicted as being separate from UE device 116, MRA module 118 may be partially or fully integrated with UE device 116. For example, in certain embodiments, MRA module 118 is implemented by a processor of UE device 116 executing instructions in the form of software and/or firmware stored in a data store, e.g., a memory, of UE device 116.

The system for MRA of wireless communication network 100 is configured to execute one or more of the following methods for MRA, to promote high performance of wireless communication network 100: (a) Method A—select a single path, (b) Method B—combine copies of a signal, (c) Method C—joint transmission, (d) Method D—dynamic beam configuration, (e) Method E—beam direction, (f) Method F—multiple streams, (g) Method G—frequency/time resource aggregation, (h) Method H—fake base station detection, and (i) Method I—dynamic power control.

Method A—Select a Single Path

In method A, each RF repeater 106, 108, and 110 amplifies and repeats a received downlink or uplink wireless communication signal. Additionally, each RF repeater 106, 108, and 110 may receive the same copy of a downlink wireless communication signal or an uplink wireless communication signal sent by wireless base station 112 or UE device 116, respectively. As such, there may be multiple wireless communication paths for the same copy of a wireless communication signal between wireless communication node 102 and wireless communication node 104. However, these multiple wireless communication paths may not be equal. For example, one RF repeater 106, 108, and 110 may be blocked while another RF repeater 106, 108, and 110 may not be blocked. In method A, MRA module 114 and/or MRA module 118 select a single wireless communication path to transmit data between wireless communication node 102 and wireless communication node 104, such as based on one or more measured conditions of the wireless communication paths, to help optimize wireless communication between the two nodes.

In particular, one or more devices of wireless communication network 100 measure conditions of one or more wireless communication paths, or portions of wireless communication paths, of wireless communication network 100, and the devices send data representing the measured conditions to MRA module 114 and/or MRA module 118. For example, wireless base station 112 may measure conditions of wireless channels Ch0, Ch11, Ch21, and Ch31 and send data representing the measured conditions to MRA module 114 and/or MRA module 118. As another example, UE device 116 may measure conditions of wireless channels Ch0, Ch12, Ch22, and Ch32 and send data representing the measured conditions to MRA module 114 and/or MRA module 118. As additional example, RF repeater 106 may measure conditions of wireless channels Ch11 and Ch12 and send data representing the measured conditions to MRA module 114 and/or MRA module 118. Examples of possible measured conditions of wireless communication paths include, but are not limited to, one or more of reference signal received power (RSRP) of each wireless communication path, reference signal received quality (RSRQ) of each wireless communication path, time advance of each wireless communication path, cell ID of each wireless communication path, wireless communication beam ID of each wireless communication path, percentage of utilization of each wireless communication path, etc.

MRA module 114, MRA module 118, or the combination of MRA module 114 and MRA module 118, select one wireless communication path to transmit data between wireless communication node 102 and wireless communication node 104 at least partially based on the data representing the measured conditions. For example, MRA module 114 and/or MRA module 118 may select whichever wireless communication path 1, 2, 3, or 4 which has a highest RSRP, a highest RSRQ, a smallest time advance, a smallest percentage of channel utilization, etc. MRA module 114 and/or MRA module 118 then cause data to be routed between wireless communication node 102 and wireless communication node 104 solely via the one selected wireless communication path, such as by controlling wireless base station 112 and/or UE device 116 to route data accordingly. It should be noted that particular embodiments of Method A do not require coordination of RF repeater 106, RF repeater 108, or RF repeater 110, thereby enabling the RF repeaters to be conventional RF repeaters in Method A.

Figure 2:
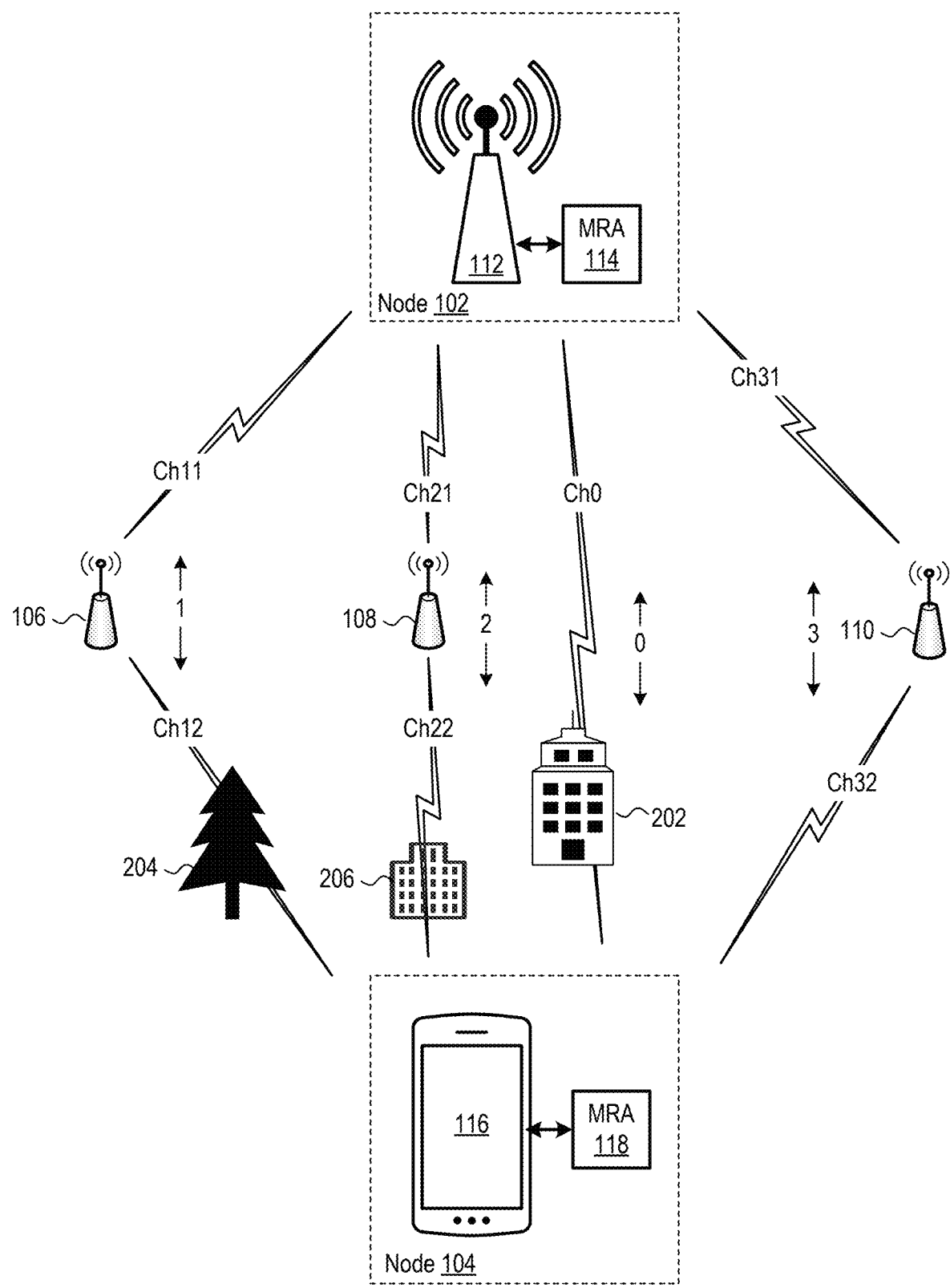
FIG. 2 is a block diagram illustrating an embodiment of a method for MRA including selecting a single wireless communication path to transmit data between two wireless communication nodes.

FIG. 2 is a block diagram of wireless communication network 100 illustrating one example of Method A. In this example, wireless communication paths 0, 1, and 2 are partially or completely blocked by a building 202, a tree 204, and a building 206, respectively. MRA module 114 and/or MRA module 118 may analyze one or more measured conditions of wireless paths 0, 1, 2, and 3 and determine that path 3 is the best path to transfer data between wireless communication node 102 and wireless communication node 104, such as in response to wireless communication path 3 having a highest RSRP, a highest RSRQ, a smallest time advance, or a smallest percentage of wireless communication path utilization. In response thereto, MRA module 114 and/or MRA module 118 cause wireless base station 112 and/or UE device 116 to route data between wireless communication node 102 and wireless communication node 104 solely via wireless communication path 1, i.e., using channel Ch31, RF repeater 110, and Ch32.

Method B—Combine Copies of a Signal

Referring again to FIG. 1, in method B, multiple copies of a wireless communication signal, i.e., either a downlink wireless communication signal or an uplink wireless communication signal, are transmitted between wireless base station 112 and UE device 116 via different respective wireless communication paths. In contrast with Method A, multiple copies of a wireless communication signal may be used by wireless base station 112 and UE device 116 in Method B. In particular, MRA module 114 and/or MRA module 118 cause wireless base station 112 to combine copies of an uplink wireless communication signal it receives via two or more of wireless communication paths 0, 1, 2, and 3 to generate a combined wireless communication signal. Similarly, MRA module 114 and/or MRA module 118 cause UE device 116 to combine copies of a downlink wireless communication signal it receives via two or more of wireless communication paths 0, 1, 2, and 3 to generate a combined wireless communication signal. Each combined wireless communication signal may have a greater amplitude than any one of its constituent copies of the wireless signal communication signal, which advantageously helps achieve a high signal to noise ratio. In some embodiments, the copies of the wireless communication signal are combined using a soft combining process. For example, wireless base station 112 may sum complex values of received copies of an uplink wireless communication signal to generated a combined uplink wireless communication signal, and UE device 116 may sum complex values of received copies of a downlink wireless communication signal to generate a combined downlink wireless communication signal. Certain embodiments of Method B do not require coordination of RF repeater 106, RF repeater 108, or RF repeater 110, thereby enabling the RF repeaters to be conventional RF repeaters in Method B.

Some embodiments of MRA module 114 and/or MRA module 118 are configured to cause wireless base station 112 and UE device 116 to combine only a predetermined quantity of received copies of a wireless communication signal, or to combine only received copies of a wireless communication signal that meet one or more predetermined criteria. For example, in one embodiment, MRA module 114 and/or MRA module 118 are configured to cause wireless base station 112 or UE device 116 to combine the two received copies of a wireless communications signal having largest RSRP values, largest RSRQ values, or smallest time advance values. As another example, in another embodiment, MRA module 114 and/or MRA module 118 are configured to cause wireless base station 112 or UE device 116 to combine only copies of a wireless communication signal having RSRP values exceeding a threshold value, RSRQ values exceeding a threshold value, or time advance values that are below a threshold value.

Figure 3:
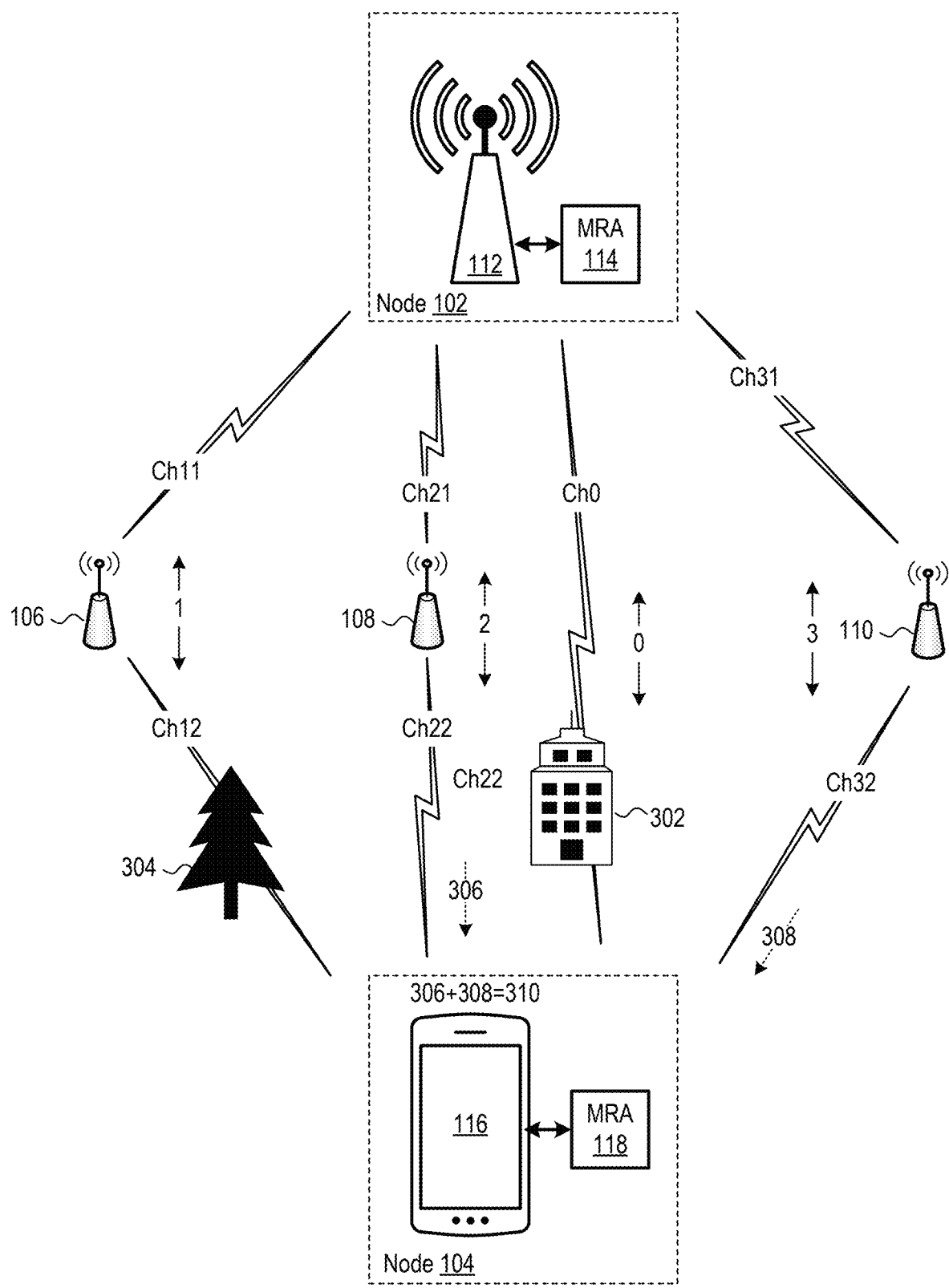
FIG. 3 is a block diagram illustrating an embodiment of a method for MRA including combining copies of a common wireless communication signal.

FIG. 3 is a block diagram of wireless communication network 100 illustrating one example of Method B. In this example, wireless communication paths 0 and 1 are blocked by a building 302 and a tree 304, respectively. Consequently, wireless communication node 104 is capable of receiving copies of a downlink wireless communication signal solely via wireless communication paths 2 and 3. Accordingly, UE device 116 receives copies 306 and 308 of a common downlink wireless communication signal, and UE device 116 combines these two copies to generate a combined downlink wireless communication signal 310, as symbolically shown by text "306+308=310" in wireless communication node 104. The magnitude of combined downlink wireless communication signal 310 is greater than the respective magnitudes of either of copies 306 and 308 of the downlink wireless communication signal. Therefore, Method B increases signal to noise ratio of downlink wireless communication signals processed by UE device 116. Wireless base station 112 could analogously receive and combine copies of an uplink wireless communication sent via wireless communication paths 2 and 3, in the FIG. 3 example.

Method C—Joint Transmission

Referring again to FIG. 1, in Method C, MRA module 114 and MRA module 118 cooperate such that data is transferred between wireless communication node 102 and wireless communication node 104 using joint transmission, such that different downlink data and/or uplink data are transferred via two or more of wireless communication paths 0, 1, 2, and 3. For example, in particular embodiments, MRA modules 114 and 118 are configured such that wireless base station 112 sends different downlink data to each of RF repeaters 106, 108, and 110 via respective wireless communication signals in wireless channels Ch11, Ch21, and Ch31. RF repeaters 106, 108, and 110 then forward the received downlink data to UE device 116 via respective wireless communication signals in each of wireless channels Ch12, Ch22, and Ch32, and UE device 116 aggregates the received wireless communication signals. Accordingly, UE device 116 receives downlink data from wireless base station 112 via multiple wireless communication paths. Similarly, in certain embodiments, MRA modules 114 and 118 are configured such that UE device 116 sends different uplink data to each of RF repeaters 106, 108, and 110 via respective wireless communication signals in each of wireless channels Ch12, Ch22, and Ch32. RF repeaters 106, 108, and 110 then forward the received uplink data to wireless base station 112 via respective wireless communication signals in each of wireless channels Ch11, Ch21, and Ch31, and wireless base station 112 aggregates the received wireless communication signals. Accordingly, wireless base station 112 receives different uplink from UE device 116 via multiple wireless communication paths. Direct path 0, i.e., wireless channel Ch0, may be additionally be used in conjunction with one or more of wire communication paths 1, 2, and 3 to further increase number of data transfer paths between wireless communication nodes 102 and 104.

Such ability to send different data via multiple wireless communication paths in Method C enables wireless communication network 100 to achieve a significantly larger throughput than would be feasible using conventional techniques. Additionally, the multiple wireless communication paths will typically be at different angles with respect to each of wireless base station 112 and UE device 116, such that there may be small correlation, or even essentially no correlation between wireless communication paths 0, 1, 2, and 3, which further increases maximum theoretical throughput of wireless communication network 100. Furthermore, use of multiple wireless communication paths for data transmission in wireless communication network 100 helps mitigate shadowing, small-scale fading, and Doppler shift. Furthermore, certain embodiments of Method C do not require coordination of RF repeater 106, RF repeater 108, or RF repeater 110, thereby enabling the RF repeaters to be conventional RF repeaters.

Figure 4:
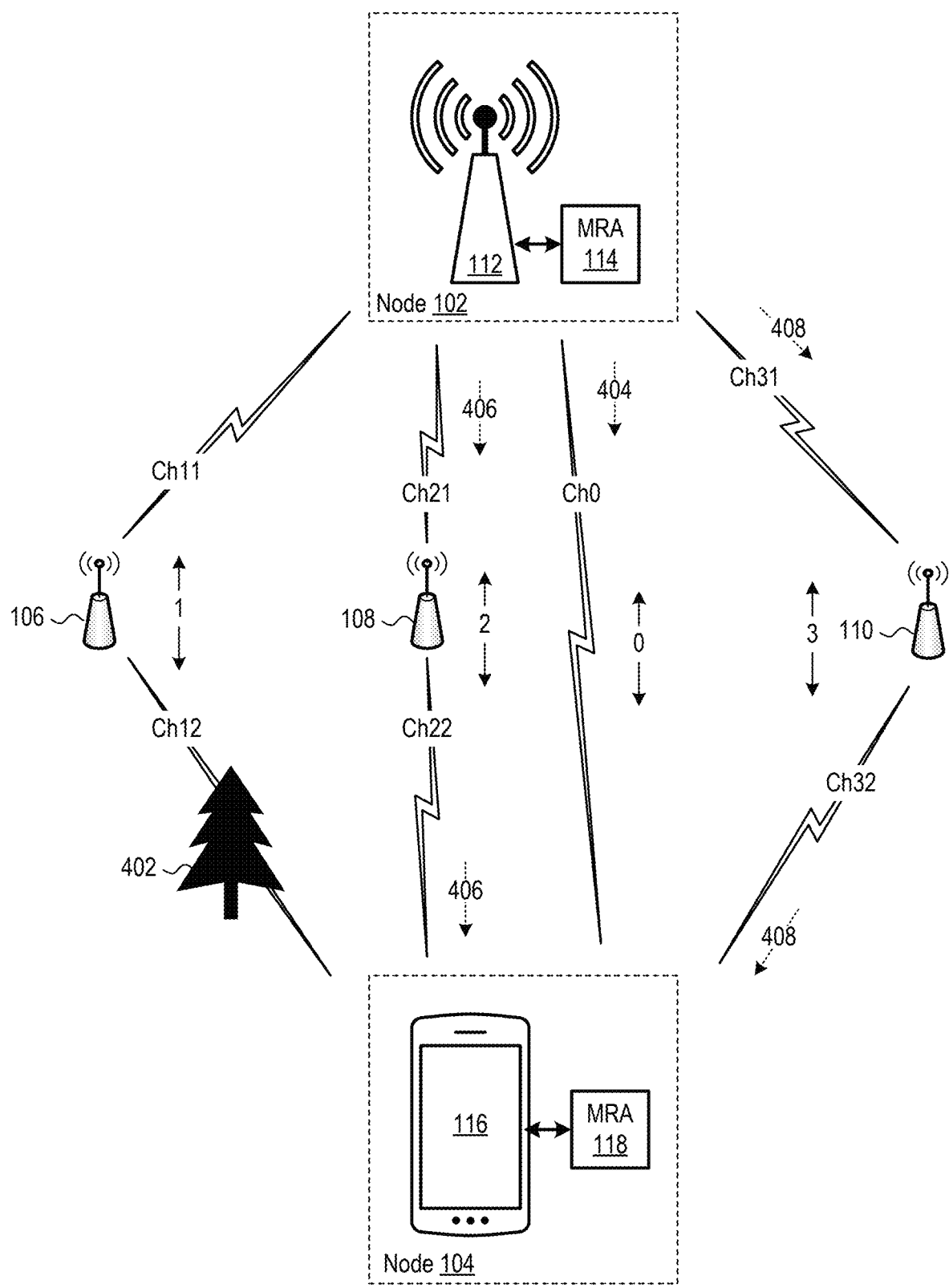
FIG. 4 is a block diagram illustrating an embodiment of a method for MRA including joint transmission.

FIG. 4 is a block diagram of wireless communication network 100 illustrating one example of Method C. In this example, wireless communication path 1 is blocked by a tree 402. However, wireless communication paths 0, 2, and 3 are available for data transmission between wireless communication nodes 102 and 104. Accordingly, MRA module 114 and MRA module 118 cooperate to provide for joint transmission of data between wireless base station 112 and UE device 116 using wireless communication paths 0, 2, and 3. For example MRA module 114 and MRA module 118 may cooperate such that wireless base station 112 sends different downlink wireless communication signals 404, 406, and 408 to UE device 116 in wireless communication via paths 0, 2, and 3. Specifically, in this example, wireless base station 112 sends downlink wireless communication signals 404 directly to UE device 116 using wireless communication path 0, and wireless base station 112 sends downlink wireless communication signals 406 and 408 via wireless channels Ch21 and Ch31 to RF repeater 108 and RF repeater 110, respectively. RF repeaters 108 and 110 then forward downlink wireless communication signals 406 and 408 to UE device 116, respectively, and UE device 116 aggregates received wireless communication signals 404, 406, and 408.

Method D—Dynamic Beam Configuration

Referring again to FIG. 1, in certain embodiments, each wireless each RF repeater 106, 108, and 110 may receive and transmit a plurality of beams. For example, wireless channel Ch11 between wireless base station 112 and RF repeater 106 may include a plurality of beams, and wireless channel Ch12 between RF repeater 106 and UE device 116 may also include a plurality of beams. As such, each of wireless communication paths 0, 1, 2, and 3 may include a plurality of possible beams by which wireless communication signals may be transmitted. In method D, MRA module 114 and/or MRA module 118 select a single wireless communication beam, or a single set of wireless communication beams, of a single wireless communication path 0, 1, 2, or 3 to transmit data between wireless communication node 102 and wireless communication node 104, such as based on one or more measured conditions of the wireless communication paths, to help optimize wireless communication between the two nodes. As such, method D is similar to method A, but method D further includes wireless communication beam coordination. The measured conditions of wireless communication paths in method D may include measured conditions of respective wireless communication beams of the wireless communication paths.

In certain embodiments of Method D, UE device 116 may measure conditions of each wireless communication beam received from each RF repeater 106, 108, and 110, and UE device 116 may send data representing the measured conditions of the wireless communication beams to MRA module 114 and/or MRA module 118. Similarly, wireless base station 112 may measure conditions of each wireless communication beam received from each RF repeater 106, 108, and 110, and wireless base station 112 may send data representing the measured conditions of the wireless communication beams to MRA module 114 and/or MRA module 118. Such measurements are performed, for example, on a periodic basis, on an aperiodic basis, or in response to an event. MRA module 114 and/or MRA module 118 may then select a single wireless communication beam, or a single set of wireless communication beams, for transmitting data between wireless communication nodes 102 and 104, based least in part on the data representing the measured conditions of the wireless communication beams. For example, MRA module 114 and/or MRA module 118 may select whichever wireless communication beam, or set of wireless communication beams, has a highest RSRP, a highest RSRQ, a smallest time advance, a smallest percentage of channel utilization, etc. MRA module 114 and/or MRA module 118 then cause data to be routed between wireless communication node 102 and wireless communication node 104 solely via the one selected wireless communication beam, or selected set of wireless communication beams, such as by controlling wireless base station 112 and/or UE device 116 to route data accordingly.

In particular embodiments, wireless base station 112 and/or UE device 116 may not distinguish between wireless communication beams sent directly between the two devices and wireless communication beams sent between the two devices via one or more RF repeaters 106, 108, and 110. Additionally, some embodiments of Method D do not require coordination of RF repeater 106, RF repeater 108, or RF repeater 110, thereby enabling the RF repeaters to be conventional RF repeaters.

Method E—Beam Direction

Method E is an alternate embodiment of Method B further including wireless communication beam coordination. In Method E, multiple copies of a downlink wireless communication signal or an uplink wireless communication signal are sent by wireless base station 112 or UE device 116 via different respective wireless communication beams. For example, wireless base station 112 may send four copies of a common downlink wireless communication signal via one or more wireless communication beams along each of wireless communication paths 0, 1, 2, and 3. As another example, UE device 116 may send four copies of an uplink wireless communication signal via one or more wireless communication beams along each of wireless communication paths 0, 1, 2, and 3. Each RF repeater 106, 108, and 110 amplifies and forwards each wireless communication beam that is receives. As such, if all four wireless communication paths 0, 1, 2, and 3 are available, UE device 116 will receive four copies of a common downlink wireless communication signal via four wireless communication beams. Similarly, if all four wireless communication paths 0, 1, 2, and 3 are available, wireless base station 112 will receive four copies of a common uplink wireless communication signal via four wireless communication beams. MRA module 114 and/or MRA module 118 cause wireless base station 112 to combine copies of an uplink wireless communication signal it receives via two or more wireless communication beams. Additionally, MRA module 114 and/or MRA module 118 cause UE device 116 to combine copies of a downlink wireless communication signal it receives via two or more wireless communication beams.

Method F—Multiple Streams

In particular embodiments of wireless communication network 100, wireless each RF repeater 106, 108, and 110 may receive and transmit a plurality of beams, and each beam may include a plurality of streams. Method F is similar to method C, but joint transmission is extended across multiple streams in each of two or more of wireless communication paths 0, 1, 2, and 3. For example, assume that each of wireless communication paths 0, 1, 2, and 3 is available, and that each path supports two streams between wireless communication nodes 102 and 104. In this example, there are eight routes between wireless communication nodes 102 and 104, which significantly increases throughput of wireless communication network 100 compared to a scenario where joint transmission is not used. Additionally, in a manner analogous to that discussed above with respect to Method C, these multiple wireless communication paths enabled by Method F will typically be at different angles with respect to each of wireless base station 112 and UE device 116, such that there may be small correlation, or even essentially no correlation between paths 0, 1, 2, and 3, which further increases maximum theoretical throughput of wireless communication network 100. Furthermore, use of multiple wireless communication paths for data transmission in wireless communication network 100 helps mitigate shadowing, small-scale fading, and Doppler shift.

Method G—Frequency/Time Resource Aggregation

Methods A-F, discussed above, advantageously implement spatial diversity of communication resources to promote high performance of wireless communication network 100. Any of methods A-F can be modified to further implement frequency and/or time diversity of communication resources among wireless communication paths 0, 1, 2, and 3, among wireless communication beams of a given wireless communication path, and/or among streams of a given wireless communication beam. Such implementation of frequency and/or time diversity in wireless communication network 100 may further promote high throughput and high reliability.

Figure 5:
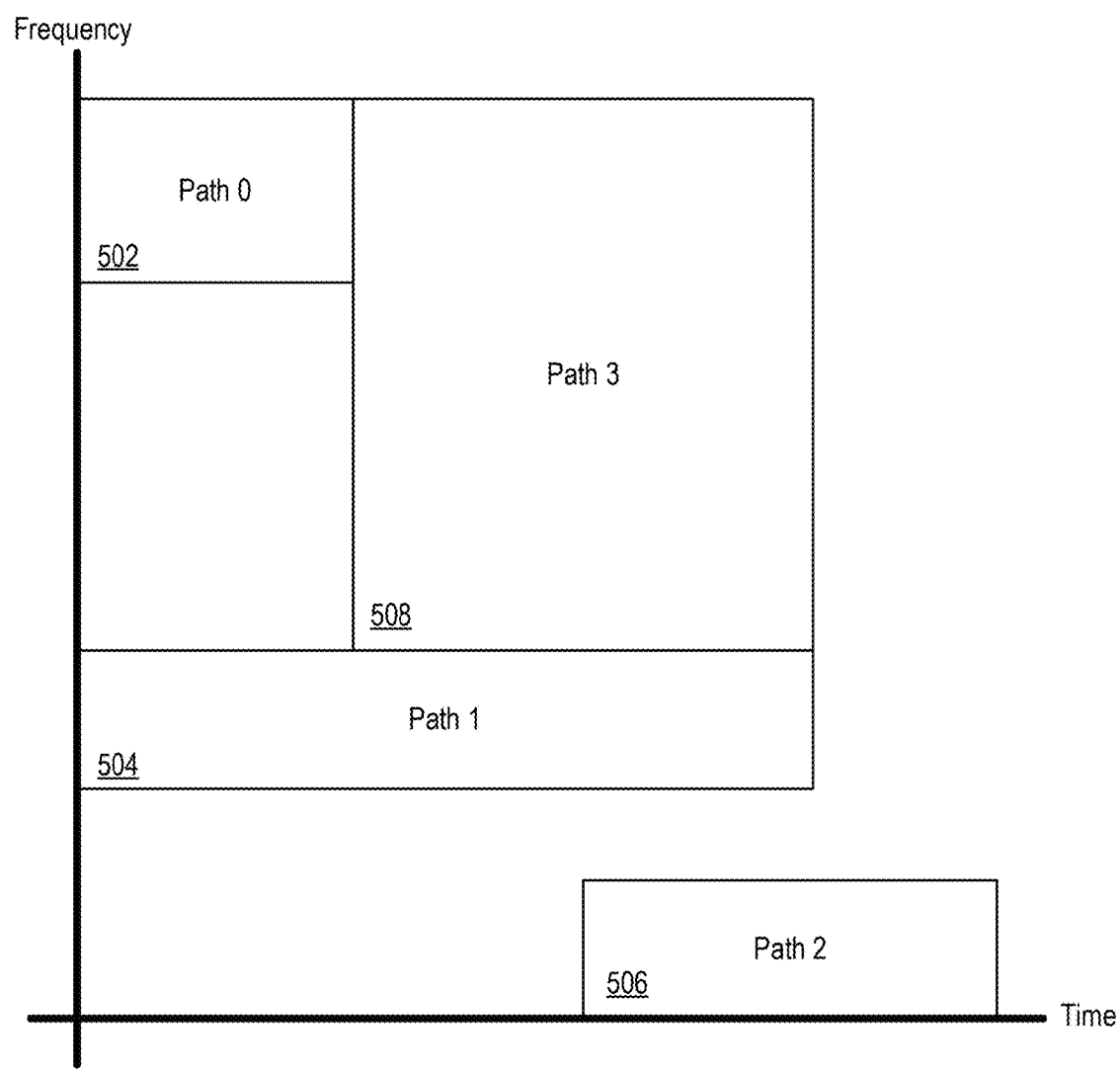
FIG. 5 is a graph illustrating one example allocation of communication resources in frequency and time across wireless communication paths of the FIG. 1 wireless communication network.

FIG. 5 is a graph 500 of frequency versus time illustrating one example of how frequency and time diversity may be implemented by MRA module 114 and/or MRA module 118. In the FIG. 5 example, a respective physical resource block (PRB) 502, 504, 506, and 508 is allocated to each of wireless communication path 0, wireless communication path 1, wireless communication path 2, and wireless communication path 3. Each PRB specifies a combination of frequency and time that may be used for the path. For example, wireless base station 112, RF repeater 106, and UE devices 116 are permitted to collectively use solely the frequency and time range specified by PRB 504 to implement wireless communication path 1.

Method H—Fake Base Station Detection

Method H detects a fake wireless base station. In method H, MRA module 114 and/or MRA module 118 analyze wireless communication signals received at a node in wireless communication network 100, such as wireless communication signals received by UE device 116 or wireless communication signals received by wireless base station 112, to determine angle of incidence of the received wireless communication signals. For example, MRA module 114 and/or MRA module 118 may determine angle of incidence of wireless communication signals received by UE device 116. Reception of a plurality of wireless communication signals at substantially different angles of incidence indicates that the sending wireless base station is likely a legitimate wireless base station. In contrast, reception of a plurality of wireless communication signals at substantially common angles of incidence indicates that the sending wireless base station is likely a fake wireless base station. Accordingly, particular embodiments of MRA module 114 and/or MRA module 118 are configured to determine that a particular wireless base station is fake in response to angle of incidence of received wireless communication signals from the wireless base station differing by less than a predetermined threshold value. Additionally, some embodiment of MRA module 114 and/or MRA module 118 are configured to determine that a particular wireless base station is legitimate in response to angle of incidence of received wireless communication signals from the wireless base station differing by more than a predetermined threshold value.

Method I—Dynamic Power Control

In certain embodiments of wireless communication network 100, amplification of RF repeaters 106, 108, and 110 may be adjusted, and method I includes MRA module 114 and/or MRA module 118 adjusting amplification or "power" of one or more to RF repeaters 106, 108, and 110 to optimize or more characteristics of wireless communication network 100. Method I may be incorporated with any of the methods discussed above. For example, method I may be incorporated with method B to help further increase signal to noise ratio of a sum of copies of a downlink or uplink wireless communication signal.

Load Balancing

A conventional smart RF repeater is capable of receiving data from a donor wireless communication node via a first wireless communication beam and forwarding the data to a child using a second wireless communication beam, in a first slot. The conventional smart RF repeater may be configured such that there is a semi-static linkage between the first wireless communication beam and the second wireless communication beam, and the second wireless communication beam may be dependent on the first slot. Accordingly, a conventional smart repeater is ill-suited for handling aggregated data for one or more target wireless communication nodes over different wireless communication beams. For example, assume a hypothetical scenario where a conventional smart RF repeater receives the following wireless communication signals from a donor: (a) a first wireless communication beam including data 1 for forwarding to a first UE device (UE 1) and (b) a second wireless communication beam including data 2 for forwarding to a second UE device (UE 2). A conventional smart RF repeater configured with a semi-static linkage between wireless communication beams would be incapable of determining how to forward data 1 and data 2 to its intended UE device.

Applicant has developed new systems and methods for load balancing which at least partially overcome the above discussed drawbacks of conventional smart repeaters. Certain embodiments are configured to associate frequency regions, or bandwidth parts (BWPs), within a given wireless communication beam with respective destination wireless communication nodes, for forwarding data. As such, a recipient smart RF repeater, or other recipient network element, can determine where to forward data carried by a wireless communication beam at least partially based on a BWP that the data occupies in the wireless communication beam. Accordingly, particular embodiments of the new systems and methods are capable of receiving data for multiple child wireless communication nodes, e.g., UE devices, customer premises equipment (CPE), and other smart RF repeaters, and forwarding the data to the child wireless communication nodes over different respective wireless communication beams.

Figure 6:
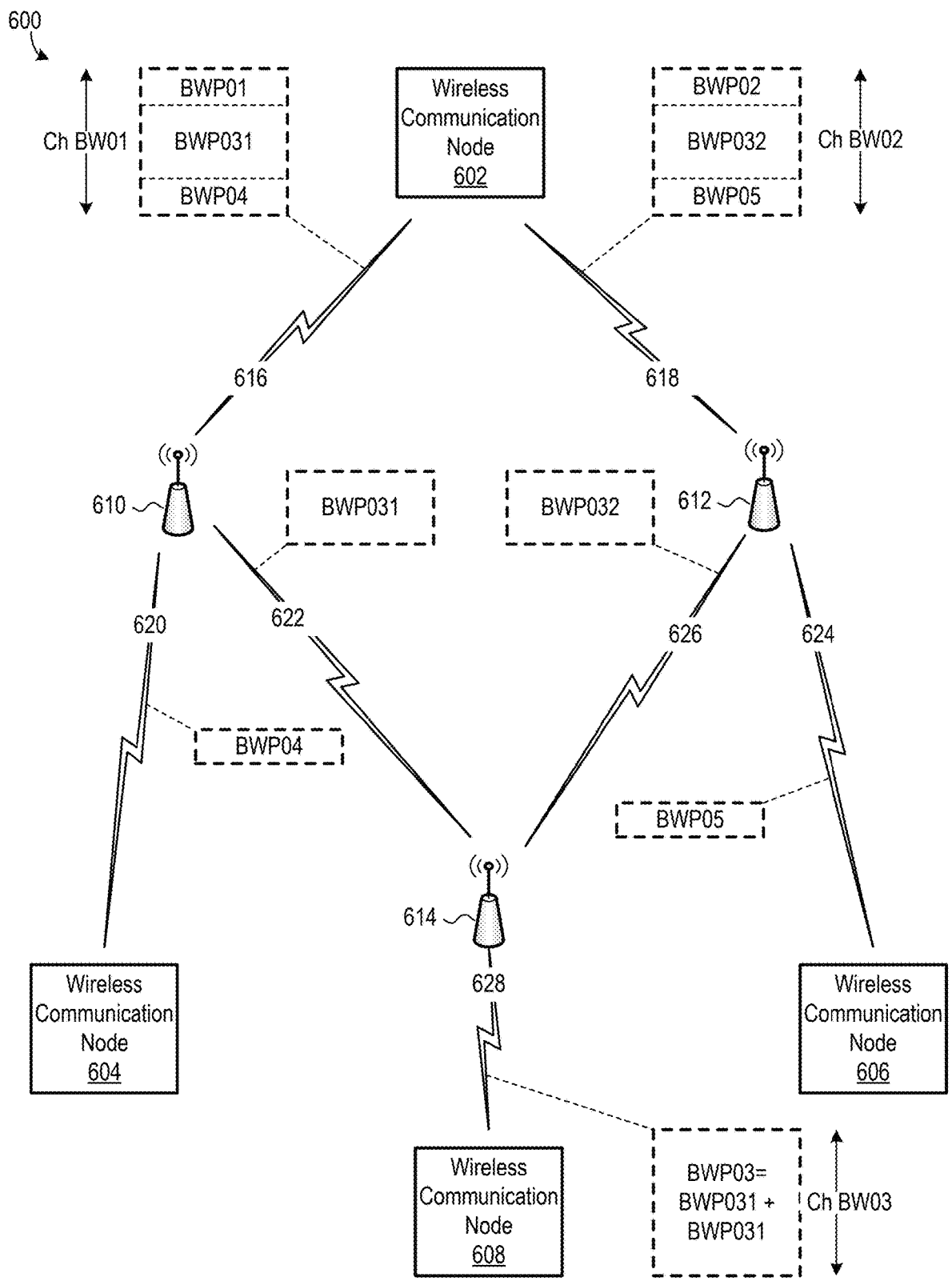
FIG. 6 is a block diagram of a wireless communication network illustrating an example of a method for load balancing, according to an embodiment.

FIG. 6 is a block diagram of a wireless communication network 600 including an embodiment of the new systems for load balancing. Wireless communication network 600 includes a wireless communication node 602, a wireless communication node 604, a wireless communication node 606, a wireless communication node 608, a smart RF repeater 610, a smart RF repeater 612, and a smart RF repeater 614. The aforesaid elements of wireless communication network 600 as configured, for example, in a mesh configuration. The number of wireless communication nodes in wireless communication network 600, as well as the number of smart repeaters in wireless communication network 600, may vary without departing from the scope hereof.

Each wireless communication node 602, 604, 606, and 608 is configured to transmit and/or receive wireless communication beams. In some embodiments, each wireless communication node 602, 604, 606, and 608 includes one or more of a wireless base station (e.g., a 3GPP wireless base station, a Wi-Fi wireless base station, a satellite wireless base station, a Bluetooth wireless base station, a LoRa wireless base station, a Zigbee wireless base station, a Z-Wave wireless base station, etc), CPE, a mobile telephone, a computer, a set-top device, a data storage device, an IoT device, an entertainment device, a computer networking device, a smartwatch, a wearable device with wireless capability, a medical device, a security device, and a monitoring device. Each wireless communication node 602, 604, 606, and 608 need not have the same configuration.

Each smart RF repeater 610, 612, and 614 is configured to receive data via wireless communication beams and forward data carried by the wireless communication beams to child wireless communication nodes according to respective BWPs associated with the data. Smart RF repeaters 610, 612, and 614 could be replaced with other devices capable of forwarding wireless communication beams, e.g., IABs, as long as the other devices are capable of forwarding data carried by wireless communication beams to child nodes according to respective BWPs associated with the data. Additionally, one or more of smart repeaters 610, 612, and 614 could be combined with another device, such as a wireless base station, CPE, or a UE device.

FIG. 6 depicts an example of operation of wireless communication network 600 in load balancing where data is being transmitted from wireless communication node 602 to other nodes of wireless communication network 600, such that wireless communication node 602 is acting as a "donor" wireless communication node. It is understood, though, that wireless communication network 600 could operate with other nodes being donor wireless communication nodes, as well as with wireless communication beams taking paths other than those illustrated in the FIG. 6 example.

In the FIG. 6 example, wireless communication node 602 transmits wireless communication beams 616 and 618 to smart RF repeaters 610 and 612, respectively, such as in different respective time slots. Each of wireless communication beams 616 and 618 is structured, in the frequency domain, into different BWPs, where each BWP encompasses a respective portion of a wireless communication channel bandwidth of the beam. In particular, wireless communication beam 616 is structured into bandwidth parts BWP01, BWP031, and BWP04, which collectively encompass a bandwidth Ch BW01 of a wireless communication channel associated with wireless communication beam 616, as illustrated in FIG. 6. Each of bandwidth parts BWP01, BWP031, and BWP04 includes data associated with a different respective wireless communication node of wireless communication network 600. Specifically, bandwidth part BWP01 includes data associated with smart RF repeater 610, bandwidth part BWP031 includes data associated with smart RF repeater 614, and bandwidth part BWP04 includes data associated with wireless communication node 604. Wireless communication beam 618, in turn, is structured into bandwidth parts BWP02, BWP032, and BWP05, which collectively encompass a bandwidth Ch BW02 of a wireless communication channel associated with wireless communication beam 618, as illustrated in FIG. 6. While not required, in certain embodiments, bandwidth Ch BW01 is equal to bandwidth Ch BW02. Each of bandwidth parts BWP02, BWP032, and BWP05 also includes data associated with a different respective wireless communication node of wireless communication network 600. Specifically, bandwidth part BWP02 includes data associated with smart RF repeater 612, bandwidth part BWP032 includes data associated with smart RF repeater 614, and bandwidth part BWP05 includes data associated with wireless communication node 606.

Smart RF repeater 610 receives a message associating bandwidth parts of wireless communication beam 616 with destination wireless communication nodes. Such message may be sent, for example, via data associated with bandwidth part BWP01, which is destined for smart RF repeater 610. The message may associate, for example, (a) bandwidth part BWP031 with smart RF repeater 614 and (b) bandwidth part BWP04 with wireless communication node 604. In some embodiments, the message is radio resource control (RRC) message. Smart RF repeater 610 then forwards data associated with each of bandwidth parts BWP031 and BWP04 to its intended destination according to destinations specified in the received message. For example, smart RF repeater 610 may receive wireless communication beam 616 in a first time slot, and smart RF repeater 610 may then forward data associated with bandwidth part BWP04 to wireless communication node 604 in a second time slot via a wireless communication beam 620, and smart RF repeater 610 may forward data associated with bandwidth part BWP031 to smart RF repeater 614 in a third time slot via a wireless communication beam 622.

Smart RF repeater 612 receives a message associating bandwidth parts of wireless communication beam 618 with destination wireless communication nodes. Such message may be sent, for example, via data associated with bandwidth part BWP02, which is destined for smart RF repeater 612. The message may associate, for example, (a) bandwidth part BWP032 with smart RF repeater 614 and (b) bandwidth part BWP05 with wireless communication node 606. In some embodiments, the message is a RRC message. Smart RF repeater 610 than forwards data associated with each of bandwidth part BWP032 and bandwidth part BWP05 to its intended destination according to destinations specified in the received message. For example, smart RF repeater 612 may receive wireless communication beam 618 in a fourth time slot, and smart RF repeater 612 may then forward data associated with bandwidth part BWP05 to wireless communication node 606 in a fifth time slot via a wireless communication beam 624, and smart RF repeater 612 may route data associated with bandwidth part BWP032 to smart RF repeater 614 in a sixth time slot via a wireless communication beam 626.

Smart RF repeater 614 aggregates (a) data associated with bandwidth part BWP031 received via wireless communication beam 622, and (b) data associated with bandwidth part BWP032 received via wireless communication beam 626, to yield aggregated data associated with bandwidth part BWP03, as illustrated in FIG. 6. In some embodiments, bandwidth part BWP03 has a bandwidth Ch BW03 which is greater than either of bandwidth Ch BW01 or Ch BW02. In some embodiments, smart RF repeater 614 receives each of wireless communication beams 622 and 626 in different respective time slots. Smart repeater 614 then forwards aggregated data associated with bandwidth part BWP03 to wireless communication node 608 via a wireless communication beam 628. However, in some alternate embodiments, smart RF repeater 614 is the final destination of aggregated data associated with bandwidth part BWP03. Additionally, in some alternate embodiments, smart repeater 614 is replaced with another device, such as CPE, a UE device, or a wireless base station, that is capable of aggregating data associated with of bandwidth part BWP031 and bandwidth part BWP032 to yield aggregated data associated with bandwidth part BWP03.

In some embodiments, each smart RF repeater 610, 612, and 614 forwards received data that is destined for another wireless communication node without processing the data. Accordingly, in particular embodiments, error management messages, e.g., error correction messages and/or error control messages, are transported from an origination wireless communication node to a destination wireless communication node via one or more smart RF repeaters 610, 612, 614 without processing the error correction messages, thereby achieving end-to-end error correction and/or error control. Examples of such error correction messages include, but are not limited to, hybrid automatic repeat request (HARQ) messages, such as HARQ ACK messages and/or HARQ NACK messages. Additionally, some embodiments of wireless communication network 600 are configured to retransmit a data structure, such as a transport block (TB), via an alternate path in the event that the data structure, as received by the destination node, includes one or more errors.

Figure 7:
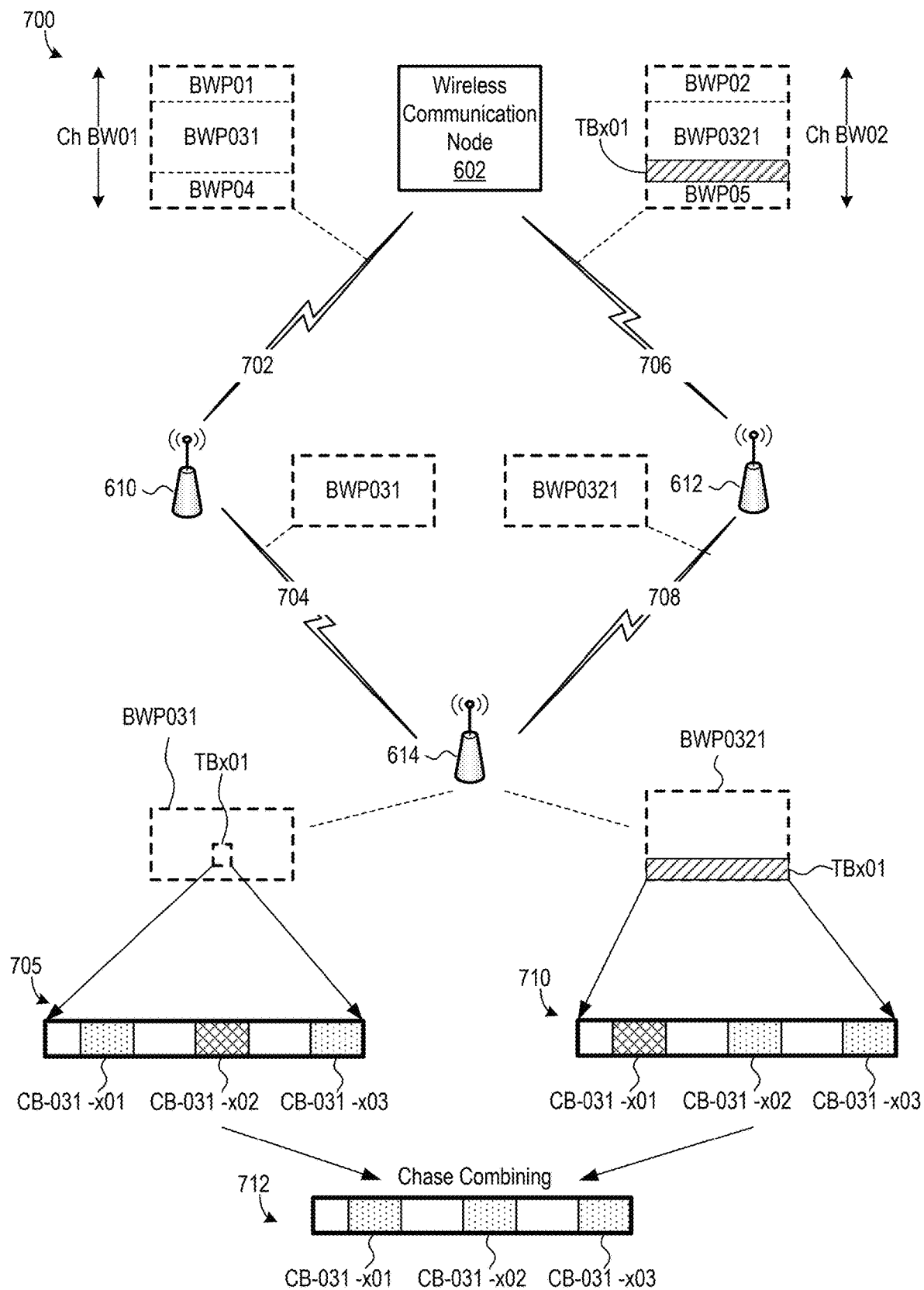
FIG. 7 is a block diagram of an embodiment of the FIG. 6 wireless communication network configured to retransmit a data structure via an alternate path, in response to the data structure including errors.

For instance, FIG. 7 is a block diagram of a wireless communication network 700, which is one embodiment of wireless communication network 600 configured to retransmit a data structure via an alternate path in response to the data structure including errors. Wireless communication nodes 604, 606, and 608 of FIG. 6 are not shown in FIG. 7 for illustrative clarity. FIG. 7 depicts an example where a transport block included in bandwidth part BWP031 includes an error. In particular, wireless communication node 602 transmits a wireless communication beam 702 to smart RF repeater 610, where wireless communication beam 702 includes bandwidth parts BWP01, BWP031, and BWP04. Smart RF repeater 610 then forwards data associated with bandwidth part BWP031 to smart RF repeater 614 via a wireless communication beam 704. Bandwidth part BWP031 includes a plurality of transport blocks, although only one transport block, i.e., transport block TBx01, is shown in FIG. 7 for illustrative clarity. Each transport block includes a plurality of coding block groups (CBGs) (not shown), and each coding block group includes a plurality of coding blocks (CBs) (not shown).

Smart RF repeater 614 processes each coding block of each coding block group in each transport block, to determine if there are any errors. Additionally, smart RF repeater 614 sends a HARQ ACK message to wireless communication node 602 via smart RF repeater 610 and/or 612 in response to each data unit that is successfully received by smart repeater 614, and smart RF repeater 614 sends a HARQ NACK message to wireless communication node 602 via smart RF repeater 610 and/or 612 in response to each data unit that is not successfully received by smart repeater 614. As such, wireless communication network 700 supports end-to-end HARQ between wireless communication nodes 602 and 604 and across one or more smart RF repeaters.

In the FIG. 7 example, smart repeater 614 determines that one coding block in a first copy 705 of transport block TBx01 includes an error. Specifically, coding block CB-031-$x$02 includes an error as symbolically shown in FIG. 7 by the coding block being filled with cross-hatching, while coding blocks CB-031-$x$01 and CB-031-$x$03 do not include errors, as symbolically shown in FIG. 7 by the coding block being filled with light shading. Smart repeater 614 then sends a message to wireless communication node 602 advising of the error in transport block TBx01, within a prescribed time interval associated with coding block CB-031-$x$02.

Wireless communication node 602 retransmits transport block TBx01 to smart RF repeater 614 via a different path than that used to originally send transport block TBx01 to smart RF repeater 614, in response to receiving the message indicating the error in transport block TBx01. In particular, wireless communication node 602 transmits a wireless communication beam 706 to smart RF repeater 612, with transport block TBx01 appended to the end of bandwidth part BWP0321. Smart RF repeater 612 then forwards data associated with BWP0321 to smart RF repeater 614 via a wireless communication beam 704, such that smart RF repeater 614 receives a second copy 710 of transport block TBx01 via bandwidth part BWP0321.

Coding blocks CB-031-$x$02 and CB-031-$x$03 in second copy 710 of transport block TBx01 are error free. However, coding block CB-031-$x$01 in second copy 710 of transport block TBx01 includes an error. Nevertheless, smart RF repeater 614 has received error-free copies of each coding blocks CB-031-$x$01, CB-031-$x$02, and CB-031-$x$03, between first copy 705 and second copy 710 of transport block TBx01. Accordingly, smart RF repeater 614 generates a combined copy 712 of transport block TBx01 from error-free coding blocks of each of first copy 705 of TBx01 and second copy of TBx01, using, for example, a chase combining process. While the FIG. 7 example illustrates combined copy 712 transport block of TBx01 being formed from only two copies of the transport block, combined copy 712 of transport block of TBx01 could be formed using additional copies of the transport block, such as by executing a chase combining process a plurality of times.

Variable Time Division Duplex Data Allocation

Time division duplex (TDD) may be used to transmit uplink and downlink data in a communication network. In TDD, a common frequency band is used to transmit both uplink data and downlink data, but the uplink data and the downlink data are transmitted at different times, e.g., in different slots. Applicant has developed systems and methods for variable TDD data allocation that significantly advance the state of the art. For example, in certain embodiments, an on-demand portion of TDD communication resources is allocated to a communication node having a highest data transmission requirement. The same allocation may be replicated by a smart RF repeater (or other device) on subsequent communication links, such as between the smart repeater and one or more downstream child communication nodes, to minimize (or eliminate) the need for physical (PHY) layer processing and media access control (MAC) processing in the smart RF repeater. Furthermore, in particular embodiments, unused TDD allocations may be used by a smart RF repeater for local data transmission. Moreover, in some embodiments, unused TDD allocations may be used for direct communication between two nodes in a communication network.

Figure 8:
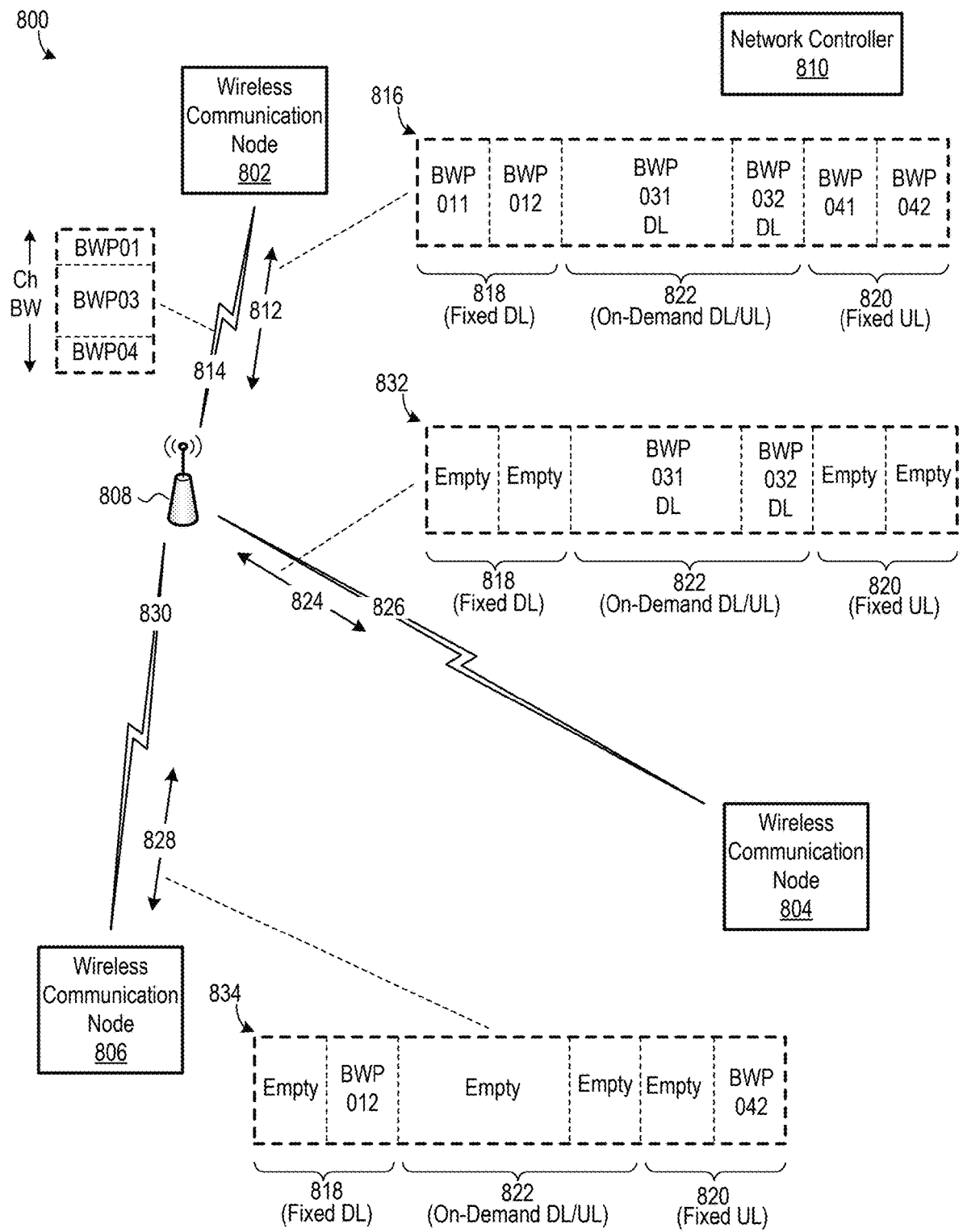
FIG. 8 is a block diagram of a wireless communication network including a system for variable time division duplex (TDD) data allocation, according to an embodiment.

FIG. 8 is a block diagram of a wireless communication network 800 including an embodiment of the new systems for variable TDD data allocation. Wireless communication network 800 includes a wireless communication node 802, a wireless communication node 804, a wireless communication node 806, a wireless communication node 808, and a network controller 810. Wireless communication nodes 802, 804, 806, and 808 are configured, for example, in a mesh configuration. Wireless communication nodes 804, 806, and 808 are downstream of wireless communication node 802, and wireless communication node 802 is accordingly upstream of wireless communication nodes 804, 806, and 808. The number of wireless communication nodes in wireless communication network 800 may vary without departing from the scope hereof.

Wireless communication node 808 is a smart RF repeater that is configured to receive data frames carried by wireless communication beams and forward the data frames via other wireless communication beams. Wireless communication node 808 could alternately be another type of RF repeating device, such as an IAB, having capability to support the disclosed methods for variable TDD data allocation.

Each wireless communication node 802, 804, and 806 is configured to transmit and/or receive wireless communication beams. In some embodiments, each wireless communication node 802, 804, and 806 includes one or more of a wireless base station (e.g., a 3GPP wireless base station, a Wi-Fi wireless base station, a satellite wireless base station, a Bluetooth wireless base station, a LoRa wireless base station, a Zigbee wireless base station, a Z-Wave wireless base station, etc.), CPE, a mobile telephone, a computer, a set-top device, a data storage device, an IoT device, an entertainment device, a computer networking device, a smartwatch, a wearable device with wireless capability, a medical device, a security device, a monitoring device, a RF repeater, a smart RF repeater, and an IAB. Each wireless communication node 802, 804, and 806 need not have the same configuration. For example, in certain embodiments, wireless communication node 802 is a wireless base station (e.g., a 3GPP wireless base station such as a LTE wireless base station, a 5G wireless base station, or a 6G wireless base station), wireless communication node 804 is a smart RF repeater or CPE, and wireless communication node 806 is a smart RF repeater or CPE.

Network controller 810 is configured to control one or more of wireless communication nodes 802, 804, 806, and 808 to implement variable TDD data allocation in wireless communication network 800. Some embodiments of network controller 810 include a processor (not shown) and a memory (not shown), where the processor is configured to execute instructions in the form of software and/or firmware stored in the memory to implement variable TDD data allocation in wireless communication network 800. While network controller 810 is depicted as being a discrete element, network controller 810 could be integrated with one or more other elements. For, example, in some embodiments, network controller 810 is at least partially integrated with a core wireless communication network (not shown), such as a 3GPP core wireless communication network, a satellite core wireless communication network, or a Wi-Fi core wireless communication network. As another example, in some embodiments, network controller 810 is at least partially integrated within one or more of wireless communication nodes 802, 804, 806, and 808. Network controller 810 may be a distributed controller, e.g., network controller 810 may be distributed among two or more elements, such as among a core wireless communication network and one or more of wireless communication nodes 802, 804, 806, and 808, or among two or more of wireless communication nodes 802, 804, 806, and 808.

FIG. 8 depicts an example of operation of wireless communication network 800 where data is being transmitted between wireless communication node 802 and wireless communication nodes 804, 806, and 808 in a point to multi-point manner, such that wireless communication node 802 is acting as a donor wireless communication node and each wireless communication node 804, 806, and 808 is acting as a child wireless communication node. It is understood, though, that wireless communication network 800 could operate with another node being a donor wireless communication node and with other nodes being child wireless communication nodes, as well as with wireless communication beams taking paths other than those illustrated in the FIG. 8.

In the FIG. 8 example, data is transmitted between wireless communication node 802 and wireless communication node 808 via first TDD data frames 812 carried by one or more first wireless communication beams 814. Additionally, data is transmitted between wireless communication node 808 and wireless communication node 804 via second data TDD frames 824 carried by one or more second wireless communication beams 826, and data is transferred between wireless communication node 808 and wireless communication node 806 via third TDD data frames 828 carried by one or more third wireless communication beams 830.

Data carried by wireless communication beams in wireless communication network 800 is structured in the frequency domain into different BWPs, where each BWP encompasses a respective portion of a wireless communication channel bandwidth between two wireless communication nodes. In particular, each wireless communication beam is structured into bandwidth parts BWP01, BWP03, and BWP04, which collectively encompass a bandwidth Ch BW of a wireless communication channel between two wireless communication nodes. A bandwidth part may be used for downlink and uplink data transmission at different respective times, or a bandwidth part may be used to transmit data between different wireless communication nodes at different respective times. In the FIG. 8 example, bandwidth part BWP01 is referred to as BWP011 when used for downlink data transmission to wireless communication node 808, and bandwidth part BWP01 is referred to as BWP012 when used for downlink data transmission to wireless communication node 806. Bandwidth part BWP03 is referred to as BWP031 when used for downlink data transmission to wireless communication node 804, and bandwidth part BWP03 is referred to as BWP032 when used for uplink data transmission from wireless communication node 804. Bandwidth part BWP04 is referred to as BWP041 when used for uplink data transmission from wireless communication node 808, and bandwidth part BWP04 is referred to as BWP042 when used for uplink data transmission from wireless communication node 806. The quantity and use of BWPs in wireless communication network 800 may vary without departing from the scope hereof.

Network controller 810 is configured to allocate data in first TDD data frames 812 according to a first data frame allocation 816. First data frame allocation 816 includes a fixed downlink (DL) portion 818, a fixed uplink (UL) portion 820, and an on-demand downlink/uplink (DL/UL) portion 822, where the portions of first data frame allocation 816 are separated from each other in the time domain. In some embodiments, first data frames 812 at least partially conform to a 3GPP wireless communication protocol, including but not limited to a LTE wireless communication protocol, a 5G wireless communication protocol, a 6G wireless communication protocol, extensions of any of the foregoing wireless communication protocols, or successors to any of the foregoing wireless communication protocols.

Network controller 810 is further configured to variably allocate on-demand portion 822 to data to be transferred to one or more client wireless communication nodes, such as based on current operating conditions of wireless communication network 800. For example, network controller 810 may be configured to determine a highest traffic child wireless communication node of child wireless communication nodes 804, 806, and 808, where the highest traffic child wireless communication node is a child wireless communication node 804, 806, or 808 having a highest data transmission requirement, e.g. a child wireless communication node requiring a highest uplink bandwidth and/or a highest downlink bandwidth. Network controller 810 may then allocate on-demand portion 822 of first data frame allocation 816 to data associated with the highest traffic child wireless communication node, while allocating fixed portions 818 and 820 of first data frame allocation 816 to data associated with other child wireless communication nodes. Network controller 810 may additionally variably allocate symbols of on-demand DL/UL portion 822 to data associated with the highest traffic child wireless communication node, such as by changing a split between downlink data and uplink data according to changing data transmission requirements of the highest traffic child wireless communication node.

The FIG. 8 example assumes that wireless communication node 804 currently has a highest data transmission requirement and is therefore the current highest traffic child wireless communication node. Accordingly, first data frame allocation 816 depicts on-demand DL/UL portion 822 being allocated to BWP031 and BWP032, i.e., to both downlink data and uplink data associated with wireless communication node 804. Fixed DL portion 818 is allocated to BWP011 and BWP012, and fixed UL portion 820 is allocated to BWP041 and BWP042, in the FIG. 8 example.

Wireless communication node 808 forwards received data to another wireless communication node according (a) the BWP including the data and (b) the portion of a TDD data frame including the data. In particular, wireless communication node 808 forward data received via first data frames 812 as follows: (a) downlink data included in BWP031 of on-demand DL/UL portion 822 is forwarded to wireless communication node 804 via second TDD data frames 824 carried by second wireless communication beams 826, and (b) downlink data included in BWP012 of fixed DL portion 818 is forwarded to wireless communication node 806 via third TDD data frames 828 carried by third wireless communication beams 830. Wireless communication node 808 does not forward downlink data included in BWP011 of fixed DL portion 818 received via first data frames 812 because wireless communication node 808 is the ultimate destination for this downlink data. Additionally, wireless communication node 808 forwards uplink data included in BWP032 of on-demand DL/UL portion 822 and received via second TDD data frames 824 to wireless communication node 802, and wireless communication node 808 forwards uplink data included in BWP042 of fixed UL portion 820 and received via third data frames 828 to wireless communication node 802. Wireless communication node 808 additionally sends internally generated uplink data to wireless communication node 802 via BWP041 of fixed UL portion 820.

In particular embodiments, network controller 810 replicates first data frame allocation 816 on second TDD data frames 824 and third TDD data frames 828, which helps minimize PHY layer processing requirements and MAC layer signaling of requirements wireless communication node 808. For example, FIG. 8 illustrates that data is allocated in second data frames 824 and in third data frames 828 according to a second data frame allocation 832 and a third data frame allocation 834, respectively. Second data frame allocation 832 is a replica of first data frame allocation 816 in that non-empty portions of second data frame allocation 832 are allocated to bandwidth parts in the same manner as in first data frame allocation 816. For example, on-demand DL/UL portion 822 is allocated to BWP031 and BWP032 in second data frame allocation 832 in the same manner as in first data frame allocation 816. Additionally, third data frame allocation 834 is a replica of first data frame allocation 816 in that non-empty portions of third data frame allocation 834 are allocated to bandwidth parts in the same manner as in first data frame allocation 816. For example, BWP012 and BWP042 are respectively allocated to fixed DL portion 818 and fixed uplink portion 820, respectively, in third data frame allocation 834 in the same manner as in first data frame allocation 816.

Certain embodiments of wireless communication node 808 are configured to forward local data between client wireless communication nodes, as well as forward data between donor wireless communication node 802 and client wireless communication nodes 804 and 806. For example, some embodiments of wireless communication node 808 are configured to (a) prioritize forwarding of data frames between wireless communication node 802 and client wireless communication nodes 804 and 806 and (b) forward data frames between wireless communication nodes 804 and 806 using spare communication resources in wireless communication network 800, e.g., using empty portions of TDD data frames and/or unused RF spectrum.

Figure 9:
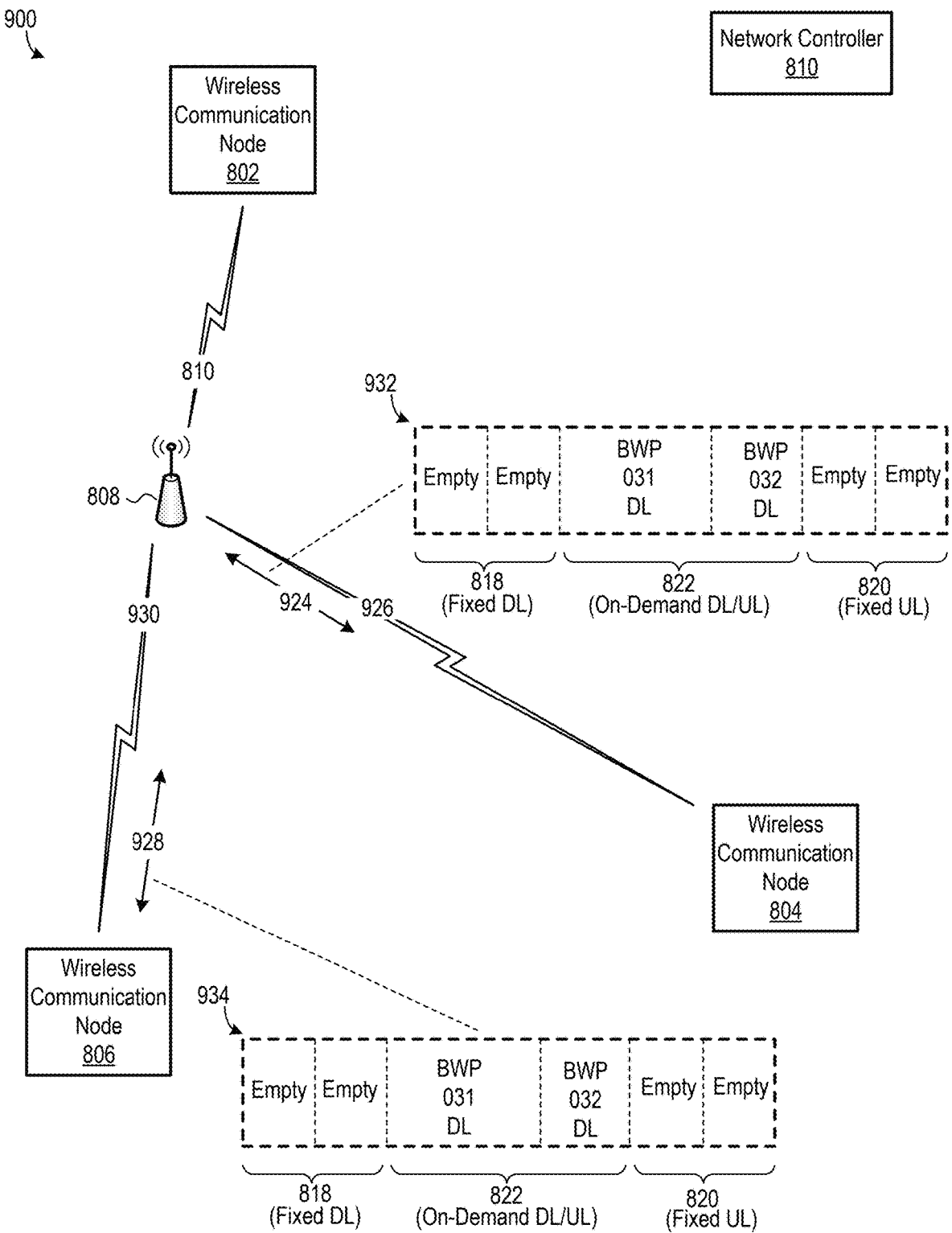
FIG. 9 is a block diagram of an embodiment of the FIG. 8 wireless communication network where a wireless communication node is configured to relay local data between child wireless communication nodes, as well as to forward data between a donor wireless communication node and child wireless communication nodes.

For example, FIG. 9 is a block diagram of a wireless communication network 900, which is one embodiment of wireless communication network 800 where wireless communication node 808 is configured to forward local data between client wireless communication nodes 804 and 806, as well as forward data between donor wireless communication node 802 and client wireless communication nodes 804 and 806. FIG. 9 illustrates an example of operation of wireless communication network 900 where wireless communication node 808 relays local data between wireless communication node 804 and wireless communication node 806 using empty portions of TDD data frames. FIG. 9 assumes that data is not currently being transmitted between wireless communication node 802 and wireless communication node 804, and on-demand DL/UL portion 822 of TDD data frames is therefore unused.

Data is transmitted between wireless communication node 804 and wireless communication node 806 via fourth TDD data frames 924 carried by one or more wireless communication beams 926, where data is allocated in fourth TDD data frames 924 according to a fourth data frame allocation 932. As illustrated in FIG. 9, fourth data frame allocation 932 allocates on-demand DL/UL portion 822 to BWP031 and BWP032 for local downlink data transmission and local uplink data transmission, respectively, between wireless communication node 804 and wireless communication node 808. Additionally, data is transmitted between wireless communication node 806 and wireless communication node 808 via fifth TDD data frames 928 carried by one or more wireless communication beams 930, where data is allocated in fifth TDD data frames 928 according to a fifth data frame allocation 934. Fifth data frame allocation 934 allocates on-demand DL/UL portion 822 to BWP031 and BWP032 for local downlink data transmission and local uplink data transmission, respectively, between wireless communication node 808 and wireless communication node 806. In some embodiments, data is transferred between wireless communication node 804 and wireless communication node 806 using a device-to-device communication protocol, e.g., using a 3GPP Sidelink wireless communication protocol.

Figure 10:
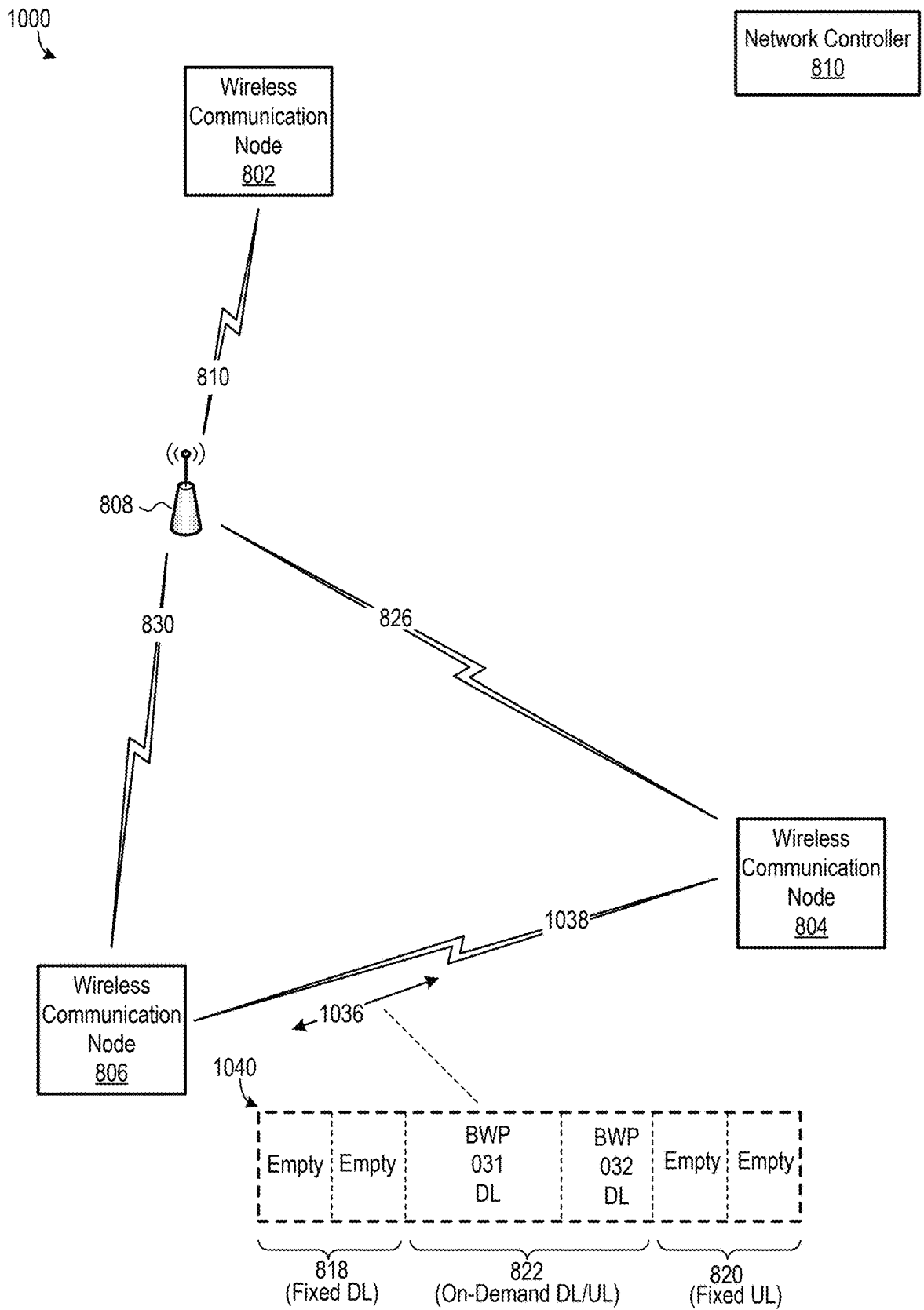
FIG. 10 is a block diagram of an embodiment of the FIG. 8 wireless communication network where two child wireless communication nodes are configured to directly communicate with each other.

Referring again to FIG. 8, in certain embodiments of wireless communication network 800, two or more child wireless communication nodes are configured to directly communicate with each other using spare communication resources in wireless communication network 800, e.g., using empty portions of TDD data frames and/or unused RF spectrum. For example, FIG. 10 is a block diagram of a wireless communication network 1000, which is one embodiment of wireless communication network 800 where wireless communication nodes 804 and 806 are configured to directly communicate with each other. FIG. 10 assumes that data is not currently being transmitted between wireless communication node 802 and wireless communication node 804, and on-demand DL/UL portion 822 of TDD data frames is therefore unused.

Data is directly transmitted between wireless communication node 804 and wireless communication node 806 via sixth TDD data frames 1036 carried by one or more wireless communication beams 1038, where data is allocated in sixth TDD data frames 1036 according to a sixth data frame allocation 1040. As illustrated in FIG. 9, sixth data frame allocation 1040 allocates on-demand DL/UL portion 822 to BWP031 and BWP032 for direct local downlink data transmission and local uplink data transmission, respectively, between wireless communication node 808 and wireless communication node 806. In some embodiments, data is transferred between wireless communication node 804 and wireless communication node 806 using a device-to-device communication protocol, e.g., using a 3GPP Sidelink communication protocol.

Referring again to FIG. 8, in certain embodiments of wireless communication network 800, network controller 810 is further configured to supplement data transmission between wireless communication nodes using spare resources in wireless communication network 800, e.g., using empty portions of TDD data frames and/or unused RF spectrum. For example, consider a scenario where no data is currently being transmitted between donor wireless communication node 802 and child wireless communication node 806. Portions of TDD data frames allocated to data associated with wireless communication node 806, i.e. BWP012 of fixed DL portion 818 and BWP042 of fixed UL portion 820, could temporarily be used to supplement data transfer between other nodes in wireless communication network 800, e.g., to supplement data transfer between donor wireless communication node 802 and child wireless communication node 804, such as to increase data transmission capacity between donor wireless communication node 802 and child wireless communication node 804.

Furthermore, in some embodiments of wireless communication network 800, network controller 810 is further configured to support data transmission between wireless communication nodes using spare resources in wireless communication network 800, e.g., using empty portions of TDD data frames and/or unused RF spectrum, in the event of failure of a communication link using allocated resources. For example, consider a scenario where (a) no data is currently being transmitted between donor wireless communication node 802 and child wireless communication node 806 and (b) a communication link between donor wireless communication node 802 and child wireless communication node 804 using allocated on-demand DL/UL portion 822 of TDD data frames fails, such as due to interference. Portions of TDD data frames allocated to data associated with wireless communication node 806, i.e. BWP012 of fixed DL portion 818 and BWP042 of fixed UL portion 820, could temporarily be used to transfer data between donor wireless communication node 802 and child wireless communication node 804, thereby providing redundancy in wireless communication network 800 in the event of failure of a primary communication link between donor wireless communication node 802 and child wireless communication node 804.

Coreset Reuse

A coreset is a set of physical resources used to carry control information in a wireless communication network. For example, a coreset in a 3GPP wireless communication network is a set of resources, e.g., physical resource blocks, within a specific area of a downlink resource grid, and the coreset in a 3GPP wireless communication network carries, for example, physical downlink control channel (PDCCH) information. Applicant has developed systems and methods for coreset reuse which use a common coreset across two or more communication links in a wireless communication network, thereby helping minimize resources required to generate and process coresets.

Figure 11:
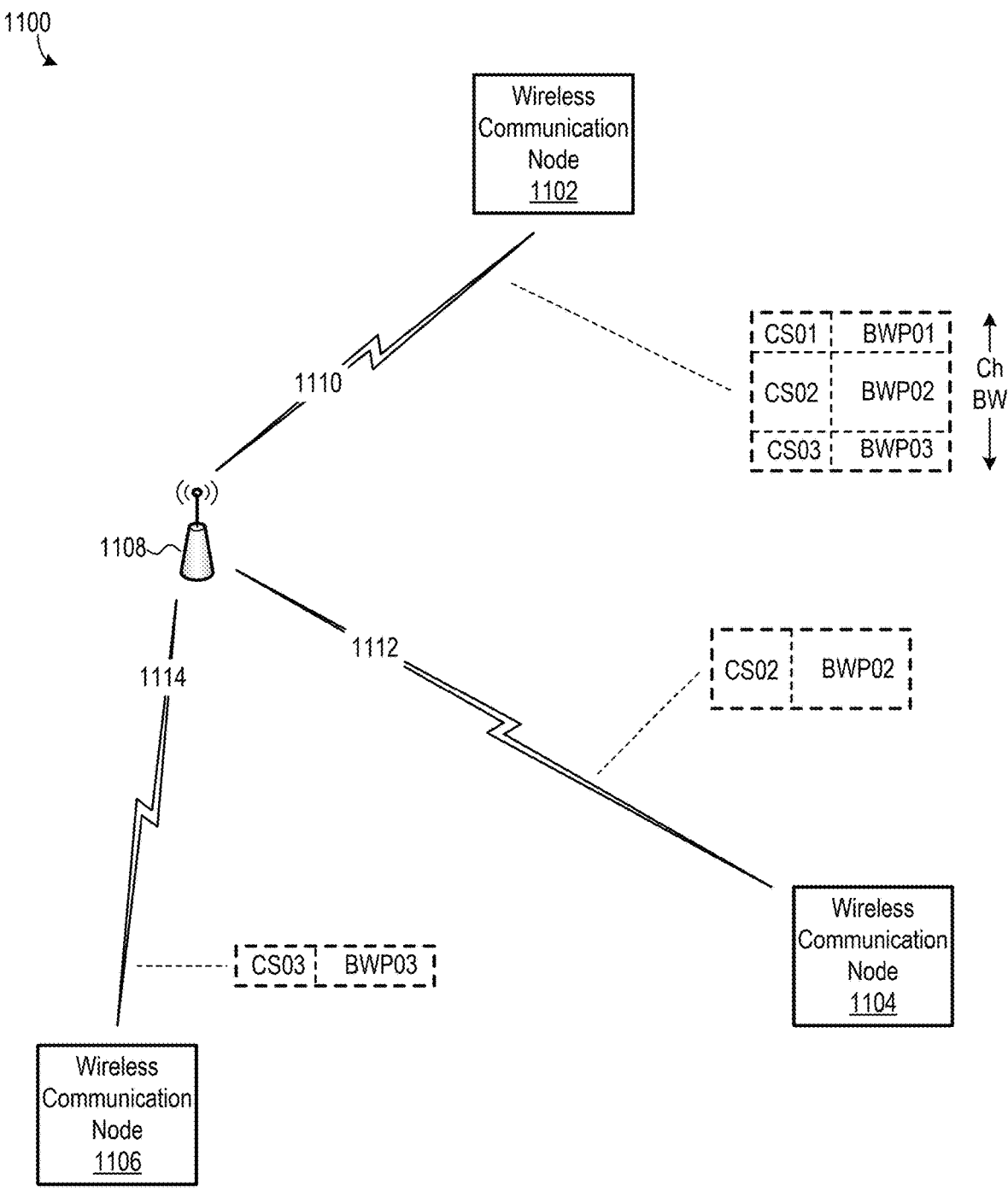
FIG. 11 is a block diagram of a wireless communication network including a system for coreset reuse, according to an embodiment.

FIG. 11 is a block diagram of a wireless communication network 1100, which is one embodiment of a wireless communication network including a system for coreset reuse. Wireless communication network 1100 includes a wireless communication node 1102, a wireless communication node 1104, a wireless communication node 1106, and a wireless communication node 1108. Wireless communication nodes 1102, 1104, 1106, and 1108 are configured, for example, in a mesh configuration. Wireless communication nodes 1104, 1106, and 1108 are downstream of wireless communication node 1102, and wireless communication node 1102 is accordingly upstream of wireless communication nodes 1104, 1106, and 1108. The number of wireless communication nodes in wireless communication network 1100 may vary without departing from the scope hereof.

Wireless communication node 1108 is a smart RF repeater that is configured to receive data frames carried by wireless communication beams and forward the data frames via other wireless communication beams. Wireless communication node 1108 could be configured to operate with either analog wireless communication beams or digital wireless communication beams. Wireless communication node 1108 could alternately be another type of RF repeating device, such as an IAB, having capability to support the disclosed methods for variable TDD data allocation.

Each wireless communication node 1102, 1104, and 1106 is configured to transmit and/or receive wireless communication beams. In some embodiments, each wireless communication node 1102, 1104, and 1106 includes one or more of a wireless base station (e.g., a 3GPP wireless base station, a Wi-Fi wireless base station, a satellite wireless base station, a Bluetooth wireless base station, a LoRa wireless base station, a Zigbee wireless base station, a Z-Wave wireless base station, etc.), CPE, a mobile telephone, a computer, a set-top device, a data storage device, an IoT device, an entertainment device, a computer networking device, a smartwatch, a wearable device with wireless capability, a medical device, a security device, a monitoring device, a RF repeater, a smart RF repeater, and an IAB. Each wireless communication node 1102, 1104, and 1106 need not have the same configuration. For example, in certain embodiments, wireless communication node 1102 is a wireless base station (e.g., a 3GPP wireless base station such as a LTE wireless base station, a 5G wireless base station, or a 6G wireless base station), wireless communication node 1104 is a smart RF repeater or CPE, and wireless communication node 1106 is a smart RF repeater or CPE.

FIG. 11 depicts an example of operation of wireless communication network 1100 where data is being transmitted between wireless communication node 1102 and wireless communication nodes 1104, 1106, and 1108 in a point to multi-point manner, such that wireless communication node 1102 is acting as a donor wireless communication node and each wireless communication node 1104, 1106, and 1108 is acting as a child wireless communication node. It is understood, though, that wireless communication network 1100 could operate with another node being a donor wireless communication node and with other nodes being child wireless communication nodes, as well as with wireless communication beams taking paths other than those illustrated in the FIG. 11.

Data is transmitted between wireless communication node 1102 and wireless communication node 1108 via one or more first wireless communication beams 1110. Additionally, data is transmitted between wireless communication node 1108 and wireless communication node 1104 via one or more second wireless communication beams 1112, and data is transmitted between wireless communication node 1108 and wireless communication node 1106 via one or more third wireless communication beams 1114. First wireless communication beams 1110, second wireless communication beams 1112, and third wireless communication beams 1114 may be either analog wireless communication beams or digital wireless communication beams. Data carried by wireless communication beams in wireless communication network 1100 is structured in the frequency domain into different BWPs, where each BWP encompasses a respective portion of a wireless communication channel bandwidth between two wireless communication nodes. In particular, each wireless communication beam is structured into bandwidth parts BWP01, BWP02, and BWP03, which collectively encompass a bandwidth Ch BW of a wireless communication channel between two wireless communication nodes, as illustrated in FIG. 11. Each of bandwidth parts BWP01, BWP01, and BWP03 includes data associated with a different respective child wireless communication node of wireless communication network 1100. Specifically, bandwidth part BWP01 includes data associated with wireless communication node 1108, bandwidth part BWP02 includes data associated with wireless communication node 1104, and bandwidth part BWP03 includes data associated with wireless communication node 1106. The number and use of BWPs in wireless communication network 1100 may vary without departing from the scope hereof.

First wireless communication beams 1110 include a respective coreset associated with each wireless communication node downstream of wireless communication node 1102. In particular, first wireless communication beams 1110 include a first coreset CS01 associated with wireless communication node 1108, a second coreset CS02 associated with wireless communication node 1104, and a third coreset CS03 associated with wireless communication node 1106. In some embodiments, each of first coreset CS01, second coreset CS02, and third coreset CS03 is a 3GPP wireless communication coreset and includes, for example, PDCCH information.

Wireless communication node 1108 exchanges data received via a wireless communication beam according to a bandwidth part of the beam. For example, wireless communication node 1108 forwards data of BWP02 received via one or more first wireless communication beams 1110 to wireless communication node 1104 via one or more second wireless communication beams 1112. As another example, wireless communication node 1108 forwards data of BWP03 received via one or more first wireless communication beams 1110 to wireless communication node 1106 via one or more third wireless communication beams 1114. As another example, wireless communication node 1108 does not forward data of BWP01 received via one or more first wireless communications beams 1110 because wireless communication node 1108 is the final destination for this data.

Importantly, wireless communication node 1108 is configured to reuse coresets, which reduces processing requirements of wireless communication node 1108. For example, wireless communication node 1108 generates second wireless communication beams 1112 such that they contain the same coreset associated with wireless communication node 1104 as first wireless communication beams 1110, or in other words, so that first wireless communication beams 1110 and second wireless communication beams 1112 include a common coreset CS02 associated with wireless communication node 1104. As another example, wireless communication node 1108 generates third wireless communication beams 1114 such that they contain the same coreset associated with wireless communication node 1106 as first wireless communication beams 1110, or in other words, so that first wireless communication beams 1110 and third wireless communication beams 1114 include a common coreset CS03 associated with wireless communication node 1106.

In some embodiments, wireless communication node 1108 forwards received data that is destined for another wireless communication node without processing the data. Accordingly, in particular embodiments, wireless communication node 1108 forwards error management messages, e.g., error correction messages and/or error control messages, from an origination wireless communication node to a destination wireless communication node without processing the error correction messages, thereby enabling end-to-end error correction and/or error control in wireless communication network 1100. For example, assume that wireless communication node 1108 receives an error management message from wireless communication node 1104. Certain embodiments of wireless communication node 1108 forward the error management message to wireless communication node 1102 without processing the error management message. As another example, assume that wireless communication node 1108 receives an error management message from wireless communication node 1102. Certain embodiments of wireless communication mode 1108 may forward the error management message to wireless communication node 1104 or to wireless communication node 1106 without processing the error management message. Examples of error management messages include, but are not limited to, HARQ messages, such as HARQ ACK messages and/or HARQ NACK messages.

Bandwidth Part Coding

Figure 12:
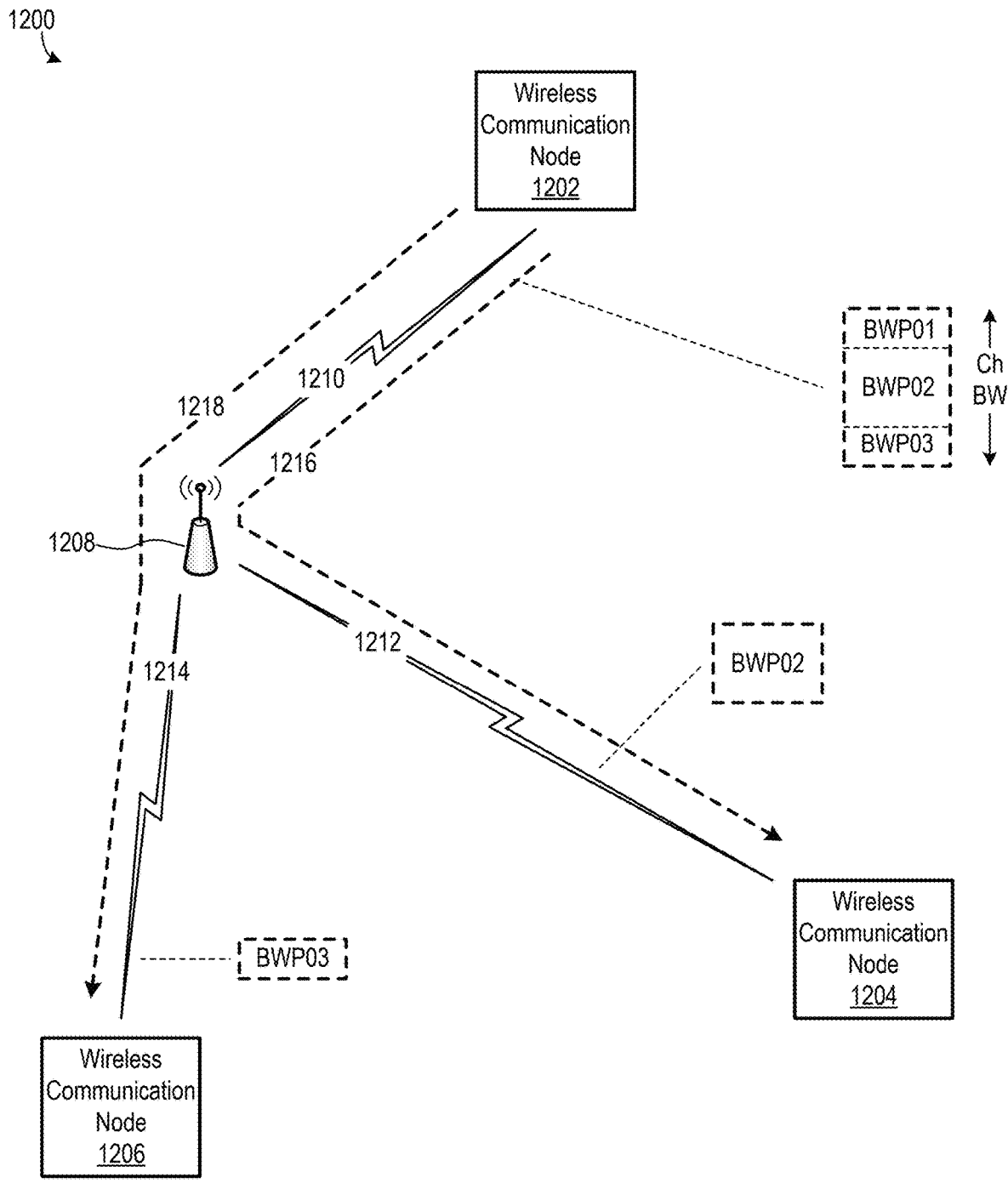
FIG. 12 is a block diagram of a wireless communication network including a system for bandwidth part coding, according to an embodiment.

Applicant has developed systems and methods for BWP coding which may reduce or eliminate BWP reprocessing at a smart RF repeater or similar device. For example, FIG. 12 is a block diagram of a wireless communication network 1200, which is one embodiment of a wireless communication network including a system for BWP coding. Wireless communication network 1200 includes a wireless communication node 1202, a wireless communication node 1204, a wireless communication node 1206, and a wireless communication node 1208. Wireless communication nodes 1202, 1204, 1206, and 1208 are configured, for example, in a mesh configuration. Wireless communication nodes 1204, 1206, and 1208 are downstream of wireless communication node 1202, and wireless communication node 1202 is accordingly upstream of wireless communication nodes 1204, 1206, and 1208. The number of wireless communication nodes in wireless communication network 1200 may vary without departing from the scope hereof.

Wireless communication node 1208 is a smart RF repeater that is configured to receive data carried by wireless communication beams and forward the data via other wireless communication beams. Wireless communication node 1208 could alternately be another type of RF repeating device, such as an IAB, having capability to support the disclosed methods for BWP coding.

Wireless communication node 1208 is capable of recoding wireless communication data transport blocks. For example, assume that wireless communication node 1208 receives data via incoming data transport blocks carried by an incoming wireless communication beam and that wireless communication node 1208 forwards the data via outgoing data transport blocks carried by an outgoing wireless communication beam. Wireless communication node 1208 is capable of coding the outgoing data transport blocks using a different modulation coding scheme (MCS) than was used to code the incoming data transport blocks, such as in response to the outgoing wireless communication beam being unable to support as high of a modulation coding scheme order as the incoming wireless communication beam.

Each wireless communication node 1202, 1204, and 1206 is configured to transmit and/or receive wireless communication beams. In some embodiments, each wireless communication node 1202, 1204, and 1206 includes one or more of a wireless base station (e.g., a 3GPP wireless base station, a Wi-Fi wireless base station, a satellite wireless base station, a Bluetooth wireless base station, a LoRa wireless base station, a Zigbee wireless base station, a Z-Wave wireless base station, etc.), CPE, a mobile telephone, a computer, a set-top device, a data storage device, an IoT device, an entertainment device, a computer networking device, a smartwatch, a wearable device with wireless capability, a medical device, a security device, a monitoring device, a RF repeater, a smart RF repeater, and an IAB. Each wireless communication node 1202, 1204, and 1206 need not have the same configuration. For example, in certain embodiments, wireless communication node 1202 is a wireless base station (e.g., a 3GPP wireless base station such as a LTE wireless base station, a 5G wireless base station, or a 6G wireless base station), wireless communication node 1204 is a smart RF repeater or CPE, and wireless communication node 1206 is a smart RF repeater or CPE.

FIG. 12 depicts an example of operation of wireless communication network 1200 where data is being transmitted between wireless communication node 1202 and wireless communication nodes 1204, 1206, and 1208 in a point to multi-point manner, such that wireless communication node 1202 is acting as a donor wireless communication node and each wireless communication node 1204, 1206, and 1208 is acting as a child wireless communication node. It is understood, though, that wireless communication network 1200 could operate with another node being a donor wireless communication node and with other nodes being child wireless communication nodes, as well as with wireless communication beams taking paths other than those illustrated in the FIG. 12.

Data is transmitted between wireless communication node 1202 and wireless communication node 1208 via one or more first wireless communication beams 1210. Additionally, data is transmitted between wireless communication node 1208 and wireless communication node 1204 via one or more second wireless communication beams 1212, and data is transmitted between wireless communication node 1208 and wireless communication node 1206 via one or more third wireless communication beams 1214. Data transmitted by wireless communication beams 1210, 1212, and 1214 is structured in the frequency domain into different BWPs, where each BWP encompasses a respective portion of a wireless communication channel bandwidth between two wireless communication nodes. In particular, each wireless communication beam is structured into bandwidth parts BWP01, BWP02, and BWP03, which collectively encompass a bandwidth Ch BW of a wireless communication channel between two wireless communication nodes. Each of bandwidth parts BWP01, BWP01, and BWP03 includes data associated with a different respective child wireless communication node of wireless communication network 1200. Specifically, bandwidth part BWP01 includes first data associated with wireless communication node 1208, bandwidth part BWP02 includes second data associated with wireless communication node 1204, and bandwidth part BWP03 includes third data associated with wireless communication node 1206. The number and use of BWPs in wireless communication network 1200 may vary without departing from the scope hereof. For example, in some alternate embodiments, data is transmitted via solely a single BWP, such as a single BWP that occupies an entirety of a respective slot.

Wireless communication node 1208 exchanges data received via a wireless communication beam according to a bandwidth part of the beam. For example, wireless communication node 1208 forwards second data of BWP02 received via one or more first wireless communication beams 1210 to wireless communication node 1204 via one or more second wireless communication beams 1212. As another example, wireless communication node 1208 forwards third data of BWP03 received via one or more first wireless communications beams 1210 to wireless communication node 1206 via one or more third wireless communication beams 1214. As another example, wireless communication node 1208 does not forward first data of BWP01 received via one or more first wireless communications beams 1210 because wireless communication node 1208 is the final destination for this data.

FIG. 12 depicts two paths including wireless communication node 1208. A first path 1216 transfers data between wireless communication node 1202 and wireless communication node 1204, and first path 1216 includes first wireless communication beams 1210, wireless communication node 1208, and second wireless communication beams 1212. A second path 1218 transfers data between wireless communication node 1202 and wireless communication node 1206, and second path 1218 includes first wireless communication beams 1210, wireless communication node 1208, and third wireless communication beams 1214.

In view of wireless communication node 1208 being capable of recoding data transport blocks, a given path 1216 or 1218 may including data transport blocks coded using different modulation coding schemes. For example, assume that first wireless communication beams 1210 are relatively free of interference while second wireless communication beams 1212 are subjected to significant interference. Wireless communication node 1202 may code data transport blocks for transmission via first wireless communication beams 1210 using a high order modulation coding scheme given that first wireless communication beams 1210 are relatively free of interference. However, wireless communication node 1208 may recode data transport blocks for transmission via second wireless communication beams 1212 using a low order modulation coding scheme given that second wireless communication beams 1212 are subject to significant interference. In such case, first path 1216 would include transport blocks code using two different modulation coding scheme, and wireless communication node 1208 would accordingly recode data transport blocks, i.e., code data transport blocks using a different modulation coding scheme than that was used to originally code the data transport blocks.

Wireless communication network is configured to implement BWP coding to reduce, or even eliminate, the need for wireless communication node 1208 recode data transport blocks to compensate for unfavorable wireless communication conditions downstream of wireless communication node 1208. In particular, wireless communication node 1202 is configured to code data transport blocks of a given BWP at a lowest modulation coding scheme used in a path including the BWP, to prevent the possible need for wireless communication node 1208 to recode the data transport blocks at a lower order modulation coding scheme. For example, assume that (a) wireless communication node 1202 codes data transport blocks of BWP02 using a first modulation coding scheme for transmission to wireless communication node 1208 via first wireless communication beams 1210, and (b) wireless communication node 1208 recodes data transport blocks of BWP02 using a second modulation coding scheme for transmission to wireless communication node 1204 via second wireless communication beams 1212, where the second modulation coding scheme has a lower order than the first modulation coding scheme. Wireless communication node 1208 may change it operation to code data transport blocks of BWP02 for transmission via first wireless communication beams 1210 using the lowest order modulation coding scheme of path 1216, i.e., the second modulation coding scheme, to eliminate the need for wireless communication node 1208 to recode data transport blocks using the second modulation coding scheme.

Figure 13:
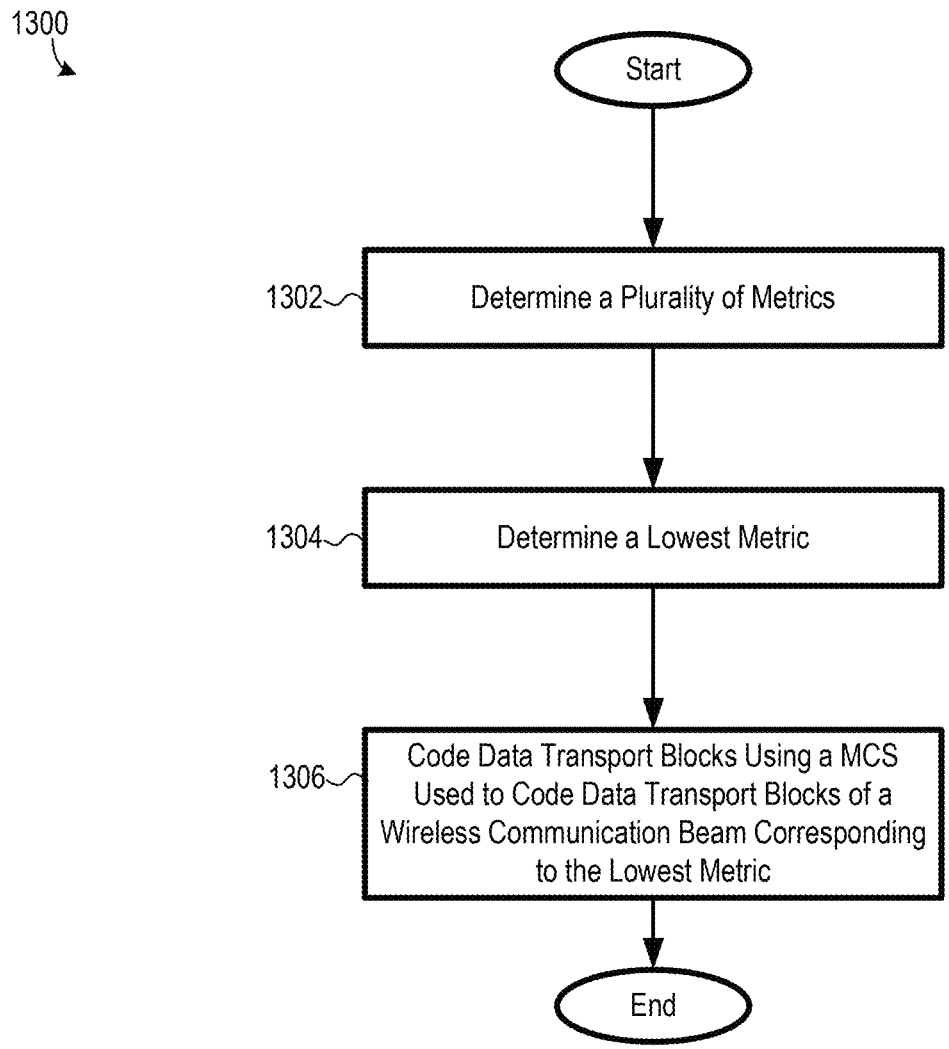
FIG. 13 is a flow chart of a method for bandwidth part coding, according to an embodiment.

FIG. 13 is a flow chart of method 1300 for BWP coding, which is one example of possible operation of wireless communication network 1300. It is understood, however, that wireless communication network 1300 is not limited to operating according to method 1300. Additionally, method 1300 could be applied to wireless communication networks other than wireless communication network 1300.

In a block 1302 of method 1300 donor wireless communication node 1202 obtains a plurality of metrics, where each metric represents communication quality a first BWP of a respective wireless communication beam in wireless communication network 1200. In one example of block 1302, (a) the first BWP is BWP02, and the first BWP accordingly encompasses an identical frequency range in each of wireless communication beams 1210 and 1212, (b) each metric is an interference plus noise ratio (SINR) of BWP02 of its respective wireless communication beam, (c) donor wireless communication node 1202 measures SINR of one or more data transport blocks of BWP02 in one or more first wireless communication beams 1210, henceforth referred to as SINR-1, (c) child wireless communication node 1208 measures SINR of one or more data transport blocks of BWP02 in one or more second wireless communication beams 1212, henceforth referred to SINR-2, and (d) child wireless communication node 1208 forwards SINR-2 to donor wireless communication node 1202. In some embodiments, SINR-1 and SINR-2 are measured using common data transport blocks in each of first wireless communication beams 1210 and second wireless communication beams 1212.

In a block 1304 of method 1300, donor wireless communication node 1202 determines a lowest metric of the plurality of metrics. In one example of block 1304, donor wireless communication node determines that SINR-2 is lower than SINR-1, such that SINR-2 is a lowest metric. In a block 1306 of method 1306, donor wireless communication node 1202 codes data transport blocks of the first BWP using a modulation coding scheme used to code data transport blocks of the first BWP of a wireless communication beam corresponding to the lowest metric. In one example of block 1306, donor wireless communication node 1202 codes data transport blocks of BWP02 for transmission via first wireless communication beams 1210 using the same modulation coding scheme used by child wireless communication node 1208 to code transport data blocks for transmission via second wireless communication beams 1212.

Combinations of Features

Features described above may be combined in various ways without departing from the scope hereof. The following examples illustrate some possible combinations.

(A1) A method for multiple repeater aggregation includes (1) receiving, at a first node of a wireless communication network, wireless communication signals from a second node of the wireless communication network via a plurality of wireless communication paths, each of the plurality of wireless communication paths including a respective radio frequency (RF) repeater, and (2) selecting one of the plurality of wireless communication paths for use in transferring data between the first node of the wireless communication network and the second node of the wireless communication network, at least partially based on measured conditions of the plurality of wireless communication paths.

(A2) The method denoted as (A1) may further include causing data to be transferred between the first node of the wireless communication network and the second node of the wireless communication network via the selected one of the plurality of wireless communication paths, without coordinating with the respective RF repeaters of the plurality of wireless communication paths.

(A3) In either one of the methods denoted as (A1) and (A2), the first node of the wireless communication network may include a user equipment (UE) device, and the second node of the wireless communication network may include a wireless base station.

(A4) In either one of the methods denoted as (A1) and (A2), the first node of the wireless communication network may include a wireless base station, and the second node of the wireless communication network may include a user equipment (UE) device.

(A5) In any one of the methods denoted as (A1) through (A4), the measured conditions of the plurality of wireless communication paths may include one or more of a reference signal received power (RSRP) of each wireless communication path of the plurality of wireless communication paths, a reference signal received quality (RSRQ) of each wireless communication path of the plurality of wireless communication paths, a time advance of each wireless communication path of the plurality of wireless communication paths, a cell identifier (ID) of each wireless communication path of the plurality of wireless communication paths, a wireless communication beam identifier (ID) of each wireless communication path of the plurality of wireless communication paths, and a percentage of wireless channel utilization of each wireless communication path of the plurality of wireless communication paths.

(A6) In any one of the methods denoted as (A1) through (A5), selecting one of the plurality of wireless communication paths to use for transferring data between the first node of the wireless communication network and the second node of the wireless communication network may include selecting one or more wireless communication beams of the selected one of the plurality of wireless communication paths.

(B1) A method for multiple repeater aggregation includes (1) receiving a plurality of copies of a wireless communication signal, each copy of the wireless communication signal being received via a respective wireless communication path of a plurality of wireless communication paths, each of the plurality of wireless communication paths including a respective radio frequency (RF) repeater, and (2) combining the plurality of copies of the wireless communication signal to generate a combined wireless communication signal.

(B2) In the method denoted as (B1), combining the plurality of copies of the wireless communication signal to generate the combined wireless communication signal may include soft combining the plurality of copies of the wireless communication signal.

(B3) In either one of the methods denoted as (B1) and (B2), the steps of receiving and combining may be performed at a user equipment device.

(B4) In either one of the methods denoted as (B1) and (B2), the steps of receiving and combining may be performed at a wireless base station.

(B5) In either one of the methods denoted as (B1) through (B4), the wireless communication signal may include one or more of downlink data and uplink data.

(B6) Any one of the methods denoted as (B1) through (B5) may further include receiving each copy of the wireless communication signal via a respective wireless communication beam.

(C1) A method for multiple repeater aggregation includes (1) receiving, at a first node of a wireless communication network, a plurality of wireless communication signals from a second node of the wireless communication network via a plurality of wireless communication paths, each of the plurality of wireless communication signals representing different data, and each of the plurality of wireless communication paths including a respective radio frequency (RF) repeater, and (2) aggregating the received plurality of wireless communication signals at the first node.

(C2) The method denoted as (C1) may further include causing data to be transferred between the first node of the wireless communication network and the second node of the wireless communication network via the plurality of wireless communication paths, without coordinating with the respective RF repeaters of the plurality of wireless communication paths.

(C3) In either one of the methods denoted as (C1) and (C2), the first node of the wireless communication network may include a wireless base station, and the second node of the wireless communication network may include a user equipment (UE) device.

(C4) In either one of the methods denoted as (C1) and (C2), the first node of the wireless communication network may include a user equipment (UE) device, and the second node of the wireless communication network may include a wireless base station.

(C5) In any one of the methods denoted as (C1) through (C4), at least two wireless communication signals of the plurality of wireless communication signals may be part of a common wireless communication beam.

(C6) In any one of the methods denoted as (C1) through (C5), at least two wireless communication signals of the plurality of wireless communication signals may be within different respective frequencies ranges and/or may be within different respective time ranges.

(D1) A method for load balancing, includes receiving, from a donor wireless communication node, a message, the message associating (a) a first bandwidth part with a first destination wireless communication node, and (b) a second bandwidth part with a second destination wireless communication node.

(D2) The method denoted as (D1) may further include (1) receiving, in a first time slot, data associated with the first bandwidth part, and (2) forwarding the data associated with the first bandwidth part to the first destination wireless communication node, in a second time slot.

(D3) The method denoted as (D2) may further include (1) receiving, in the first time slot, data associated with the second bandwidth part, and (2) forwarding the data associated with the second bandwidth part to the second destination wireless communication node, in a third time slot.

(D4) In any one of the methods denoted as (D1) through (D3), the donor wireless communication node may be a wireless base station.

(E1) A method for load balancing includes (1) receiving, via a first wireless communication beam, data associated with a first bandwidth part of the first wireless communication beam, (2) receiving, via a second wireless communication beam, data associated with a first bandwidth part of the second wireless communication beam, and (3) aggregating (a) the data associated with the first bandwidth part of the first wireless communication beam and (b) the data associated with the first bandwidth part of the second wireless communication beam.

(E2) The method denoted as (E1) may further include receiving the data associated with the first bandwidth part of the first wireless communication beam and the data associated with the first bandwidth part of the second wireless communication beam in different respective time slots.

(E3) Either one of the methods denoted as (E1) and (E2) may further include (1) receiving the data associated with the first bandwidth part of the first wireless communication beam from a first radio frequency (RF) repeater, and (2) receiving the data associated with the first bandwidth part of the second wireless communication beam from a second radio frequency (RF) repeater.

(F1) A method for end-to-end error management in a wireless communication network includes (1) receiving, at a first wireless communication node, data from a second wireless communication node via a first radio-frequency (RF) repeater, and (2) sending one or more error management messages associated with the data from the first wireless communication node to the second wireless communication node via one or more RF repeaters.

(F2) In the method denoted as (F1), the one or more error management messages may include one or more hybrid automatic repeat request (HARQ) messages.

(F3) In either one of the methods denoted as (F1) and (F2), the data received via the first RF repeater may include one or more errors, and the method may further include receiving a copy of the data via a second RF repeater.

(F4) The method denoted as (F3) may further include generating a combined copy of the data from (a) the data received via the first RF repeater and (b) the copy of the data received via the second RF repeater.

(F5) In the method denoted as (F4), generating the combined copy of the data may include using a chase combining process.

(G1) A method for variable time division duplex (TDD) data allocation in a communication network including a donor wireless communication node and a plurality of child wireless communication nodes includes (1) determining a highest traffic child wireless communication node of the plurality of child wireless communication nodes, the highest traffic child wireless communication node having a highest data transmission requirement of the plurality of child wireless communication nodes, and (2) allocating data in first TDD data frames to be transmitted between the donor wireless communication node and a first child wireless communication node of the plurality of child wireless communication nodes according to a first data frame allocation, the first data frame allocation including allocating an on-demand portion of the first TDD data frames to data associated with the highest traffic child wireless communication node.

(G2) In the method denoted as (G1), the highest traffic child wireless communication node and the first child wireless communication node may be the same child wireless communication node.

(G3) In the method denoted as (G1), the highest traffic child wireless communication node and the first child wireless communication node may be different respective wireless communication nodes.

(G4) Any one of the methods denoted as (G1) through (G4) may further include replicating the first data frame allocation on second TDD data frames to be transmitted between the first child wireless communication node and a second child wireless communication node of the plurality of child wireless communication nodes.

(G5) In the method denoted as (G4), the first child wireless communication node may be a first smart radio frequency (RF) repeater, and the second child wireless communication node may be one of a second smart RF repeater and customer premises equipment (CPE).

(G6) In any one of the methods denoted as (G1) through (G5), the first TDD data frames may at least partially conform to a Third Generation Partnership Project (3GPP) wireless communication protocol.

(G7) In the method denoted as (G6), the 3GGP wireless communication protocol may be one of a long term evolution (LTE) wireless communication protocol, a fifth generation (5G) wireless communication protocol, and a sixth generation (6G) wireless communication protocol.

(G8) Any one of the methods denoted as (G1) through (G7) may further include transmitting data between the first child wireless communication node and a second wireless communication node at least partially using unused portions of the first data frame allocation.

(G9) Any one of the methods denoted as (G1) through (G7) may further include transmitting data between (a) a second child wireless communication node of the plurality of child wireless communication nodes and (b) a third child wireless communication node of the plurality of child wireless communication nodes, at least partially using unused portions of the first data frame allocation.

(I1) A method for coreset reuse in a wireless communication network includes (1) receiving, at a first wireless communication node of the wireless communication network, first data via one or more first wireless communication beams, the first data including a first coreset, and (2) forwarding, at the first wireless communication node, the first data to a second wireless communication node via one or more second wireless communication beams, the one or more first wireless communication beams and the one or more second wireless communication beams carrying a common coreset.

(I2) In the method denoted as (I1), the common coreset may be a Third Generation Partnership Project (3GPP) coreset.

(I3) In any one of the methods denoted as (I1) and (I2), the common coreset may include physical downlink control channel (PDCCH) information.

(I4) In any one of the messages denoted as (I1) through (I3), the first wireless communication node may be a smart radio frequency (RF) repeater.

(I5) Any one of the methods denoted as (I1) through (I3) may further include (1) receiving, at the first wireless communication node, one or more error management messages associated with the first data, and (2) forwarding the one or more error management messages to another wireless communication node without processing the one or more error management messages.

(I6) In the method denoted as (I5), the one or more error management messages may include one or more hybrid automatic repeat request (HARQ) messages.

(I7) In any one of the methods denoted as (I1) through (I6), the one or more first wireless communication beams and the one or more second wireless communication beams may be either analog wireless communication beams or digital wireless communication beams.

(J1) A method for bandwidth part (BWP) coding in a wireless communication network includes (1) determining a plurality of metrics, each metric representing communication quality of a first BWP of a respective wireless communication beam in the wireless communication network, (2) determining a lowest metric of the plurality of metrics, and (3) coding, at a donor wireless communication node of the wireless communication network, data transport blocks of the first BWP using a same modulation coding scheme used to code data transport blocks of the first BWP of a wireless communication beam corresponding to the lowest metric.

(J2) In the method denoted as (J1), each metric of the plurality of metrics may represent a signal to interference plus noise ratio (SINR) of the first BWP of its respective wireless communication beam.

(J3) In any one of the methods denoted as (J1) and (J2), the first BWP of each wireless communication beam of the plurality of wireless communication beams may encompass an identical frequency range.

(J4) In any one of the methods denoted as (J1) through (J3), the first BWP of each wireless communication beam may occupy an entirety of a respective slot Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for variable time division duplex (TDD) data allocation in a communication network including a donor wireless communication node and a plurality of child wireless communication nodes, the method comprising:
   determining a highest traffic child wireless communication node of the plurality of child wireless communication nodes, the highest traffic child wireless communication node having a highest data transmission requirement of the plurality of child wireless communication nodes;
allocating data in first TDD data frames to be transmitted between the donor wireless communication node and a first child wireless communication node of the plurality of child wireless communication nodes according to a first data frame allocation,
the first data frame allocation including allocating an on-demand portion of the first TDD data frames to data associated with the highest traffic child wireless communication node; and
transmitting data between
(a) a second child wireless communication node of the plurality of child wireless communication nodes and
(b) a third child wireless communication node of the plurality of child wireless communication nodes,
at least partially using unused portions of the first data frame allocation.

2. The method of claim 1, wherein the highest traffic child wireless communication node and the first child wireless communication node are the same child wireless communication node.

3. The method of claim 1, wherein the highest traffic child wireless communication node and the first child wireless communication node are different respective wireless communication nodes.

4. The method of claim 1, further comprising replicating the first data frame allocation on second TDD data frames to be transmitted between the first child wireless communication node and a fourth child wireless communication node of the plurality of child wireless communication nodes.

5. The method of claim 4, wherein:
the first child wireless communication node is a first smart radio frequency (RF) repeater, and
the fourth child wireless communication node is one of a second smart RF repeater and customer premises equipment (CPE).

6. The method of claim 1, wherein the first TDD data frames at least partially conform to a Third Generation Partnership Project (3GPP) wireless communication protocol.

7. The method of claim 6, wherein the 3GGP wireless communication protocol is one of a long term evolution (LTE) wireless communication protocol, a fifth generation (5G) wireless communication protocol, and a sixth generation (6G) wireless communication protocol.

8. The method of claim 1, further comprising transmitting data between the first child wireless communication node and a fourth wireless communication node at least partially using additional unused portions of the first data frame allocation.

9. A method for variable time division duplex (TDD) data allocation in a communication network including a donor wireless communication node and a plurality of child wireless communication nodes, the method comprising:
prioritizing use of first TDD data frames for transmitting data between the donor wireless communication node and the plurality of child wireless communication nodes;
determining that an on-demand portion of the first TDD data frames is not being used to transfer data between the donor wireless communication node and a first child wireless communication node of the plurality of child wireless communication nodes;
in response to determining that the on-demand portion of the first TDD data frames is not being used to transfer data between the donor wireless communication node and the first child wireless communication node,
transmitting first data between the first child wireless communication node and a second child wireless communication node of the plurality of child wireless communication nodes using the on-demand portion of first TDD data frames; and
transmitting second data between
(a) a third child wireless communication node of the plurality of child wireless communication nodes and
(b) a fourth child wireless communication node of the plurality of child wireless communication nodes,
at least partially using unused portions of a data frame allocation of the first TDD data frames.

10. The method of claim 9, further comprising transmitting the first data between the first child wireless communication node and the second child wireless communication node using the on-demand portion of the first TDD data frames via a fifth child wireless communication node of the plurality of child wireless communication nodes.

11. The method of claim 10, wherein the fifth child wireless communication node is a smart radio frequency (RF) repeater.

12. The method of claim 10, wherein the fifth child wireless communication node is an Integrated Access Backhaul (IAB) device.

13. The method of claim 9, wherein the first TDD data frames at least partially conform to a Third Generation Partnership Project (3GPP) wireless communication protocol.

14. The method of claim 9, wherein the first data is transferred between first child wireless communication node and the second child wireless communication node using the on-demand portion of the first TDD data frames without use of an intervening child wireless communication node of the plurality of child wireless communication nodes.

15. A method for variable time division duplex (TDD) data allocation in a communication network including a donor wireless communication node and a plurality of child wireless communication nodes, the method comprising:
allocating data in first TDD data frames to be transmitted between the donor wireless communication node and the plurality of child wireless communication nodes according to a first data frame allocation,
the first data frame allocation including
(i) an allocation of an on-demand portion of the first TDD data frames to data associated with a first child wireless communication node of the plurality of child wireless communication nodes and
(ii) an allocation of a first fixed portion of the first TDD data frames to data associated with a second child wireless communication node of the plurality of child wireless communication nodes;
detecting failure of a communication link between the donor wireless communication node and the first child wireless communication node using the on-demand portion of the first TDD data frames;
in response to detecting the failure of the communication link between the donor wireless communication node and the first child wireless communication node using the on-demand portion of the first TDD data frames, temporarily using the first fixed portion of the first TDD data frames to transfer data between the donor wireless communication node and the first child wireless communication node; and transmitting data between
- (a) a third child wireless communication node of the plurality of child wireless communication nodes and
- (b) a fourth child wireless communication node of the plurality of child wireless communication nodes, at least partially using unused portions of the first data frame allocation.

16. The method of claim 15, further comprising transferring data between the donor wireless communication node and the first child wireless communication node via a fifth child wireless communication node of the plurality of child wireless communication nodes.

17. The method of claim 16, wherein the fifth child wireless communication node is a smart radio frequency (RF) repeater.

18. The method of claim 16, wherein the fifth child wireless communication node is an Integrated Access Backhaul (IAB) device.

19. The method of claim 15, wherein the first TDD data frames at least partially conform to a Third Generation Partnership Project (3GPP) wireless communication protocol.

* * * * *